United States Patent
Adachi et al.

(10) Patent No.: US 7,235,283 B2
(45) Date of Patent: *Jun. 26, 2007

(54) OPTICAL COMPENSATION PLATE AND DEFLECTING PLATE USING THE SAME

(75) Inventors: Junichi Adachi, Ibaraki (JP); Shuuji Yano, Ibaraki (JP); Takashi Yamaoka, Ibaraki (JP); Masayuki Kawai, Ibaraki (JP); Kanako Wasai, Ibaraki (JP); Nao Murakami, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 167 days.

This patent is subject to a terminal disclaimer.

(21) Appl. No.: 10/502,296

(22) PCT Filed: Jan. 22, 2003

(86) PCT No.: PCT/JP03/00508

§ 371 (c)(1),
(2), (4) Date: Jul. 22, 2004

(87) PCT Pub. No.: WO03/062874

PCT Pub. Date: Jul. 31, 2003

(65) Prior Publication Data

US 2005/0122586 A1 Jun. 9, 2005

(30) Foreign Application Priority Data

Jan. 23, 2002 (JP) ............................. 2002-014528

(51) Int. Cl.
*G02B 5/30* (2006.01)
*C09K 19/42* (2006.01)
*C09K 19/58* (2006.01)

(52) U.S. Cl. ................... 428/1.3; 428/1.1; 428/343; 349/117; 349/122; 252/299.01; 252/299.7

(58) Field of Classification Search ............... 428/1.1, 428/1.3, 1.31, 1.5, 1.53–1.55, 343, 349, 355 R, 428/355 EP, 355 N, 355 AC, 355 CN; 349/117–119, 349/122; 252/299.01, 299.7
See application file for complete search history.

(56) References Cited

U.S. PATENT DOCUMENTS

| 4,544,583 | A | * | 10/1985 | Claussen et al. ............ 428/1.5 |
| 5,049,427 | A | * | 9/1991 | Starzewski et al. ........ 428/40.4 |
| 5,193,020 | A | * | 3/1993 | Shiozaki et al. ............ 349/117 |
| 5,506,704 | A | * | 4/1996 | Broer et al. .................. 349/98 |

(Continued)

FOREIGN PATENT DOCUMENTS

EP 644439 3/1995

(Continued)

*Primary Examiner*—Rena Dye
*Assistant Examiner*—Sow-Fun Hon
(74) *Attorney, Agent, or Firm*—Westerman, Hattori, Daniels & Adrian, LLP.

(57) ABSTRACT

The present invention provides an optical compensation plate having an optical compensation layer in which cracks occurring due to an applied pressure is suppressed. By applying a curable adhesive agent onto at least one surface of the optical compensation layer and curing the adhesive, an anti-cracking layer is formed directly on the surface of the optical compensation layer. The occurrence of cracks in the optical compensation layer can be prevented by this anti-cracking layer. The optical compensation layer preferably is a layer having a cholesteric structure, and the constituent material thereof is preferably a non-liquid crystal polymer formed by polymerizing aligned liquid crystal monomers or an aligned liquid crystal polymer.

17 Claims, 1 Drawing Sheet

U.S. PATENT DOCUMENTS

| | | | |
|---|---|---|---|
| 5,516,456 A * | 5/1996 | Shinohara et al. | 252/299.01 |
| 5,518,783 A | 5/1996 | Kawata et al. | 428/1 |
| 5,717,474 A * | 2/1998 | Sarma | 349/85 |
| 5,730,899 A * | 3/1998 | Ohnishi et al. | 252/299.01 |
| 5,863,457 A * | 1/1999 | Hasebe et al. | 252/299.01 |
| 5,976,297 A * | 11/1999 | Oka et al. | 156/241 |
| 6,605,235 B1 * | 8/2003 | Meyer et al. | 252/299.01 |
| 6,627,270 B1 * | 9/2003 | Nishimura | 428/1.3 |
| 6,638,582 B1 * | 10/2003 | Uchiyama et al. | 428/1.2 |
| 6,773,766 B2 * | 8/2004 | Meyer et al. | 428/1.1 |
| 6,900,937 B2 * | 5/2005 | Saiki et al. | 359/490 |

FOREIGN PATENT DOCUMENTS

| | | |
|---|---|---|
| EP | 1 160 591 | 12/2001 |
| JP | 7-120620 | 5/1995 |
| JP | 7-120620 A | 5/1995 |
| JP | 7-120748 | 5/1995 |
| JP | 2660601 | 6/1997 |
| JP | 2692035 | 9/1997 |
| JP | 2802719 | 7/1998 |
| JP | 2000-85057 A | 3/2000 |
| JP | 2001-305345 | 10/2001 |
| JP | 2001-343529 | 12/2001 |
| JP | 2001-350021 | 12/2001 |
| JP | 2001-350021 A | 12/2001 |

* cited by examiner

OPTICAL COMPENSATION PLATE AND DEFLECTING PLATE USING THE SAME

This application is a 371 of PCT/JP03/00508 filed Jan. 22, 2003.

TECHNICAL FIELD

The present invention relates to an optical compensation plate, a polarizing plate using the same and an image display apparatus using the same.

BACKGROUND ART

In a liquid crystal display, both surfaces of a liquid crystal cell in which a liquid crystal is retained are generally provided with a polarizer. In order to visually compensate for retardation caused by birefringence of the liquid crystal cell in a front direction and an oblique direction, a birefringent layer is further disposed as an optical compensation layer between the liquid crystal cell and the polarizer. As this birefringent layer, a negative birefringent layer that is obtained by aligning cholesteric liquid crystal molecules on an alignment substrate and whose refractive indices (nx, ny, nz) satisfy a negative uniaxiality "nx=ny>nz" usually is used. The refractive indices (nx, ny, nz) respectively indicate refractive indices in three axial directions in the birefringent layer. The axial directions of the refractive indices (nx, ny, nz) in the birefringent layer are indicated specifically by arrows in a schematic view of FIG. 1. As mentioned above, the refractive indices nx, ny, nz respectively indicate refractive indices in an X-axis direction, a Y-axis direction and a Z-axis direction. As shown in the figure, the X-axis direction is an axial direction exhibiting a maximum refractive index within the plane, the Y-axis direction is an axial direction perpendicular to the X axis within the plane, and the Z-axis direction is a thickness direction perpendicular to the X axis and the Y axis.

For the optical compensation layer, for example, an optical compensation layer is reported, which is provided by forming an alignment film on a support and inclinedly aligning a discotic liquid crystal on this alignment film (see, for example, Japanese Patent 2692035, and Japanese Patent 2802719).

It has been also reported that a cholesteric liquid crystal layer is formed by applying a liquid crystal polymer onto an alignment substrate and aligning the liquid crystal polymer, and that the cholesteric liquid crystal layer is used as an optical compensation layer (see Japanese Patent 2660601, for example).

DISCLOSURE OF INVENTION

However, the optical compensation layer formed of the cholesteric layer as described above had a problem that cracks (for example, breaks, fractures and the like) occur when a pressure is locally applied by, for example, a shake or the like during transportation. In the case where cracks occur in the optical compensation layer as described above, this optical compensation layer, when used for a LDC, may lead to a problem in a display property, for example, occurrence of decoloration at a displaying part.

Accordingly, an object of the present invention is to provide an optical compensation plate including an optical compensation layer in which cracks due to, for example, a shake and an applied pressure is prevented from occurring, and provide a polarizing plate and various image display apparatuses including the optical compensation plate.

In order to attain the above object, the optical compensation plate of the present invention is a optical compensation plate including an optical compensation layer, in which an anti-racking layer of a curable adhesive agent is laminated directly on at least one surface of the optical compensation layer.

As mentioned above, by disposing a adhesive layer (that is, the anti-cracking layer) made of a curable adhesive agent, directly on at least one surface of the optical compensation layer, the occurrence of cracks in the optical compensation layer due to, for example, a shake and a locally applied pressure mentioned above can be suppressed.

The anti-cracking layer may be laminated on one or both sides of the optical compensation layer. Even when the anti-cracking layer is laminated only on one side of the optical compensation layer, the occurrence of cracks can be suppressed sufficiently, and the thickness of the optical compensation plate can be further reduced. Whereas, when the anti-cracking layers are laminated on both surfaces of the optical compensation layer, durability against a shake and an applied pressure can be improved further, whereby the occurrence of cracks can be suppressed further.

Furthermore, the polarizing plate of the present invention is characterized to include a polarizer, a transparent protective layer and the optical compensation plate of the present invention. Since the polarizing plate includes the optical compensation plate of the present invention, even when a shake, a pressure or the like is applied to the polarizing plate of the present invention, cracks do not occur, thereby an excellent quality can be maintained. Also, the polarizing plate of the present invention is useful for a liquid crystal panel, and suitable for the use in a liquid crystal display. The polarizing plate of the present invention can be used not only in the liquid crystal display but also in self-light-emitting displays, for example, an electroluminescence (EL) display, a plasma display (PD) and a field emission display (FED).

BEST MODE FOR CARRYING OUT THE INVENTION

Figure 1:
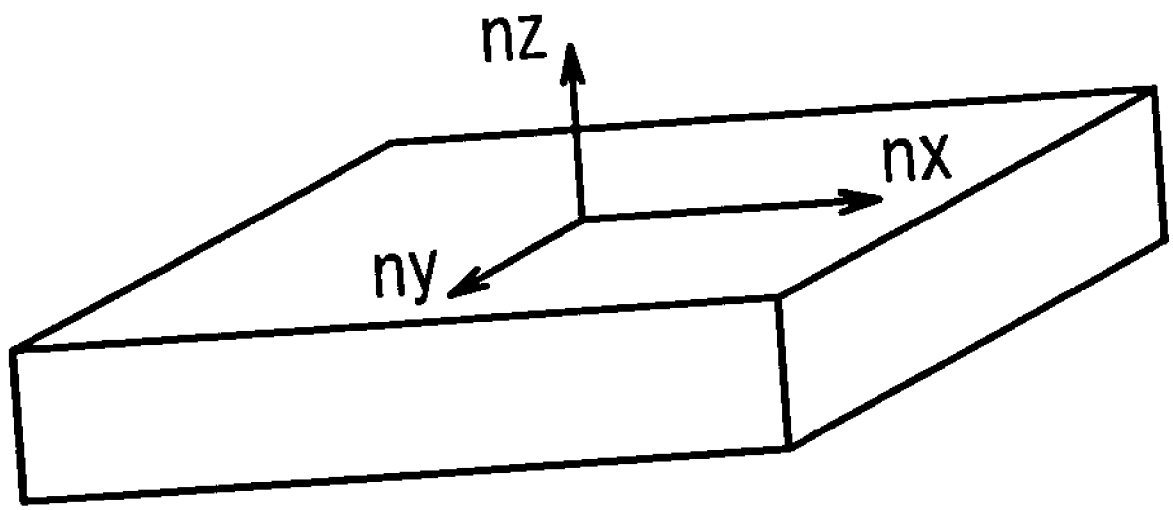
FIG. 1 is a schematic view showing axial directions of refractive indices.

As described above, the optical compensation plate of the present invention is an optical compensation plate including an optical compensation layer, in which an anti-cracking layer made of a curable adhesive agent is laminated directly on at least one surface of the optical compensation layer.

The anti-cracking layer is not particularly limited as long as it is made of the curable adhesive agent, but, for example, the microhardness thereof preferably ranges from 0.1 to 0.5 GPa, more preferably ranges from 0.2 to 0.5 GPa, and particularly preferably ranges from 0.3 to 0.4 GPa. Here, since the correlation between the microhardness and Vickers hardness is known, the microhardness can be expressed in terms of Vickers hardness.

The microhardness can be calculated from an indentation deepness and an indentation load, by using, for example, a thin film hardness meter (trade name: MH4000, MHA-400 or the like) manufactured by NEC Corporation.

The kind of the curable adhesive agent is not particularly limited, but examples include curable adhesive agents such as a photocuring adhesive like an ultraviolet-curing adhesive, a moisture-curing adhesive, a thermosetting adhesive and the like. Among them, the moisture-curing adhesive is preferable.

Specific examples of the curable adhesive agent include thermosetting resin-based adhesives such as an epoxy resin, an isocyanate resin, a polyimide resin and the like, moisture-curing adhesives such as an isocyanate resin-based adhesive and the like. Among them, an isocyanate resin-based adhesive of a moisture-curing adhesive is preferable. Here, the isocyanate resin-based adhesive is a general name of polyisocyanate-based adhesives and polyurethane resin adhesives.

In the optical compensation plate of the present invention, the thickness of the anti-cracking layer preferably ranges, for example, from 0.1 to 20 µm, more preferably ranges from 0.5 to 15 µm, and particularly preferably ranges from 1 to 10 µm. In addition, the thickness of the cholesteric layer ranges, for example, from 0.5 to 10 µm, more preferably ranges from 1 to 8 µm, and particularly preferably ranges from 2 to 6 µm.

In the optical compensation plate of the present invention, the optical compensation layer is preferably a cholesteric layer whose constituent molecules are aligned in the form of a cholesteric structure.

In the present invention, the cholesteric layer also can be called a layer having a pseudo-layer structure, so-called a planar structure or a Granjean structure, in which the constituent molecules of the layer have a helical structure and a screw axis thereof is aligned substantially perpendicularly to the in-plane direction. Also, the state in which the "constituent molecules have a cholesteric structure" in the present invention is not limited to the case where liquid crystalline compounds are in a cholesteric liquid crystalline phase, for example, but also includes the state where non-liquid crystalline compounds are aligned in a helical manner as in the cholesteric liquid crystalline phase. Incidentally, this state is not a liquid crystalline phase. Accordingly, the constituent molecules of the cholesteric layer can be, for example, liquid crystal polymers or non-liquid crystal polymers described below.

In the cholesteric layer, it is preferable that the above-mentioned refractive indices (nx, ny, nz) in the three axial directions satisfy nx≈ny>nz, for example. An optical compensation plate including an optical compensation layer with such optical characteristics can be used as a so-called negative C-Plate retardation plate.

In the optical compensation plate of the present invention, the cholesteric layer has a selective reflection wavelength which ranges, for example, from 100 nm to 320 nm. The upper limit of the selective reflection wavelength range is preferably 300 nm or lower. On the other hand, the lower limit thereof is preferably 150 nm or higher. When the selective reflection wavelength is in this range, for example, coloration of the cholesteric layer, light leakage in a crossed Nicol state and the like can be prevented sufficiently. Therefore, when the optical compensation plate of the present invention is used for various image display apparatuses, the superior display property can be provided both in the front direction and in the oblique direction.

In the case where the cholesteric layer is formed using a liquid crystal monomer as described later, for example, a center wavelength of the selective reflection wavelength range λ (nm) can be expressed by the equation below.

$$\lambda = n \cdot P$$

In the above equation, n indicates an average refractive index of the liquid crystal monomer, and P indicates a helical pitch (µm) of the cholesteric layer. The average refractive index n is expressed by "$(n_o+n_e)/2$" and usually ranges from 1.45 to 1.65, with $n_o$ indicating an ordinary index of the liquid crystal monomer and $n_e$ indicating an extraordinary index of the liquid crystal monomer.

It is preferable that the cholesteric layer contains a chiral dopant. The chiral dopant in the present invention is, for example, a chemical compound having a function of aligning constituent compounds such as a liquid crystal monomer and/or a liquid crystal polymer described later so as to have a cholesteric structure.

The chiral dopant is not particularly limited in kind as long as it can align constituent molecules of the cholesteric layer to have a cholesteric structure as described above, but the chiral dopants that will be described later are preferable, for example.

In these chiral dopants, the helical twisting power thereof preferably is at least $1 \times 10^{-6}$ nm$^{-1} \cdot$(wt %)$^{-1}$, more preferably is at least $1 \times 10^{-5}$ nm$^{-1} \cdot$(wt %)$^{-1}$, further preferably ranges from $1 \times 10^{-5}$ to $1 \times 10^{-2}$ nm$^{-1} \cdot$(wt %)$^{-}$, and particularly preferably ranges from $1 \times 10^{-4}$ to $1 \times 10^{-3}$ nm$^{-1} \cdot$(wt %)$^{-1}$. By using the chiral dopant with the above helical twisting power, for example, the helical pitch of the formed cholesteric layer can be controlled to the range described below, making it duly possible to control the selective reflection wavelength range to the above-noted range.

In general, the helical twisting power refers to an ability to give a twist to liquid crystal materials such as a liquid crystal monomer and/or a liquid crystal polymer, which will be described later, thus aligning those materials in a helical manner, and is expressed by the equation below.

Helical twisting power=1/[Cholesteric pitch (nm)× Weight ratio of chiral dopant (wt %)]

In the above equation, the weight ratio of chiral dopant refers to the ratio (weight ratio) of the chiral dopant in a mixture containing, for example, a liquid crystal monomer and/or a liquid crystal polymer, and the chiral dopant, and is expressed by the equation below.

Weight ratio of chiral dopant (wt %)=[X/(X+Y)]×100

X: Weight of chiral dopant
Y: Weight of liquid crystal monomer or liquid crystal polymer Further, the helical pitch in the cholesteric layer is, for example, 0.25 µm or smaller, preferably ranges from 0.01 to 0.25 µm, more preferably ranges from 0.03 to 0.20 µm and particularly preferably ranges from 0.05 to 0.15 µm. The helical pitch of 0.01 µm or larger achieves, for example, a sufficient orientation, whereas the helical pitch of 0.25 µm or smaller makes it possible to suppress sufficiently optical rotatory power on a shorter wavelength side of visible light, for example, thus preventing light leakage sufficiently for use under polarized light. Also, by using the chiral dopant having the above-described helical twisting power, it becomes possible to control the helical pitch of the formed cholesteric layer to the above-noted range.

In the cholesteric layer, a single hue b value is preferably, for example, 1.2 or smaller, more preferably is 1.1 or smaller, and particularly preferably is 1.0 or smaller. The cholesteric layer having a single hue b value in the above-noted range, for example, has very small coloration and achieves truly excellent optical characteristics. The single hue b value in this range can be attained by, for example, controlling a selective reflection wavelength range to the above-noted range.

The single hue b value is defined by the HunterLab colorimetric system (Hunter, R. S.: J. Opt. Soc. Amer., 38, 661(A), 1094(A) (1948); J. Opt. Soc. Amer., 48, 985 (1958)). More specifically, in accordance with JIS K 7105 5.3, for example, tristimulus values (X, Y, Z) of a sample are measured using a spectrophotometer or a photoelectric calorimeter and substituted into the Hunter equation, which is shown below as a color difference equation in the L, a, b space, thereby calculating a single hue b value. Usually, a C light source is used for this measurement, for example, using an integrating-sphere spectral transmittance meter (trade name DOT-3C; manufactured by Murakami Color Research Laboratory).

$$\text{Single hue } b = 7.0 \times (Y - 0.847Z)/Y^{1/2}$$

A first specific example of the constituent molecules of the cholesteric layer is a non-liquid crystal polymer, and the non-liquid crystal polymer is preferably a polymer obtained by polymerizing or cross-linking liquid crystal monomers that are aligned in the form of a cholesteric structure. Since the monomer shows a liquid crystalline property as described below because of this structure, the monomer can be aligned in the form of a cholesteric structure, and this orientation can be fixed by polymerizing the monomers. Therefore, although the liquid crystal monomer is used, the polymer that is polymerized by the above-mentioned fixing will have a non-liquid crystalline property. Here, for example, when the below-described chiral dopant is used to allow the liquid crystal monomers to have a cholesteric structure, the polymer will be a non-liquid crystal polymer which is obtained by polymerizing and cross-linking the liquid crystal monomers with the chiral dopant.

For the constituent molecules of the cholesteric layer, the above-described non-liquid crystal polymer is preferable for the following reason. The cholesteric layer formed of the above-noted non-liquid crystal polymer has a cholesteric structure as in a cholesteric liquid crystalline phase, but is not constituted by liquid crystal molecules as mentioned above. Therefore, there occurs no transformation peculiar to the liquid crystal molecules, i.e., between a liquid crystalline phase, a glassy phase and a crystalline phase due to temperature change. Consequently, since an extremely stable optical compensation layer whose cholesteric structure is not affected by temperature change can be achieved, the optical compensation plate of the present invention is useful as a retardation film for optical compensation, for example.

It is preferable that the liquid crystal monomer is represented by the chemical formula (1) below. Although such liquid crystal monomers generally are nematic liquid crystal monomers, the liquid crystal monomer of the present invention is given a twist by the chiral dopant and eventually achieves a cholesteric structure. Also, since the monomer needs to be polymerized or cross-linked for fixing the orientation in the cholesteric layer, it is preferable that the monomer contains at least one of a polymerizable monomer and a cross-linkable monomer.

When using the liquid crystal monomer, it is preferable that the cholesteric layer further contains at least one of a polymerizing agent and a cross-linking agent, and a ultraviolet curing agent, a photocuring agent or a thermosetting agent can be used, for example.

The ratio of the liquid crystal monomer in the cholesteric layer preferably ranges, for example, from 75 wt % to 95 wt %, and more preferably ranges from 80 wt % to 90 wt %. Also, the ratio of a chiral dopant to the liquid crystal monomer preferably ranges from 5 wt % to 23 wt %, and more preferably ranges from 10 wt % to 20 wt %. Further, the ratio of the cross-linking agent or the polymerizing agent to the liquid crystal monomer preferably ranges from 0.1 wt % to 10 wt %, more preferably ranges from 0.5 wt % to 8 wt %, and particularly preferably ranges from 1 wt % to 5 wt %.

Also, examples of the constituent molecules of the cholesteric layer can include a liquid crystal polymer in addition to the non-liquid crystal polymer, and may be a cholesteric layer having the liquid crystal polymer aligned in the form of a cholesteric structure. The liquid crystal polymer can be selected from, for example, the various liquid crystal polymers disclosed in Japanese Patent 2660601.

The optical compensation plate of the present invention may be formed of only the above-noted optical compensation layer and the anti-cracking layer, but may further include a substrate and a laminate including the cholesteric layer laminated on the substrate.

The optical compensation plate of the present invention can be manufactured by, for example, preparing an optical compensation layer in advance, applying a curable adhesive agent onto at least one surface of the optical compensation layer, and curing the coating film of the curable adhesive agent.

For the curable adhesive agent, for example, a commercially available adhesive agent may be used, or a curable resin solution may be prepared by dissolving or dispersing the above-noted various curable resins in a solvent. The content ratio of the curable resin in this solvent ranges, for example, from 10 to 80 weight %, preferably ranges from 20 to 60 weight %, and more preferably ranges from 30 to 50 weight % by solid weight. More specifically, when the curable resin is isocyanate resin, the content ratio thereof ranges, for example, from 20 to 80 weight %, preferably ranges from 25 to 65 weight %, and more preferably ranges from 30 to 50 weight %.

The kind of the solvent can be determined suitably, for example, according to the kind of the curable resin, and for example, ethyl acetate, methyl ethyl ketone, methyl isobutyl ketone, toluene, xylene and the like can be used. A mixture of a plurality of these solvents can be used as necessary.

The amount of the adhesive to be applied onto the optical compensation layer can be determined suitably, for example, in accordance with the required thickness of the anti-cracking layer to be formed. More specifically, in the case where the above-noted curable resin solution is applied, the amount of the adhesive to be applied ranges, for example, from 0.3 to 3 ml, preferably ranges from 0.5 to 2 ml, and particularly preferably ranges from 1 to 2 ml with respect to the area (cm$^2$) of the optical compensation layer.

The method for curing the curable adhesive agent is not particularly limited, and can be determined suitably, for example, in accordance with the kind of the curable adhesive agent. When the curable resin is a moisture-curing resin-based adhesive, it can be cured by reacting with water in the air, adsorbed water on the surface of an adherend or active hydrogen groups such as a hydroxyl group, a carboxyl group and the like. Thus, the curable adhesive agent may be cured naturally by the conventionally known method, for example, by applying the adhesive and letting it stand. Here, the above-noted solvent included in the adhesive may be volatilized by air drying or heat drying.

In the case where the curable resin is a photocuring adhesive, it can be cured by irradiating the coating film with ultraviolet light or visible light, and the condition can be determined in accordance with the conventionally known method.

In the present invention, the optical compensation layer on which the anti-cracking layer is laminated is not particularly limited in kind, but the cholesteric layer including non-liquid crystal polymers as constituent molecules as mentioned above can be prepared, for example, in the following method.

The method for manufacturing the cholesteric layer includes the steps of, for example, forming an expanded layer by expanding onto an alignment base a coating solution that contains a liquid crystal monomer, the chiral dopant and at least one of a polymerizing agent and a cross-linking agent, subjecting the expanded layer a heat treatment so that the liquid crystal monomer can be aligned in the form of a cholesteric structure, and subjecting the expanded layer at least one of a polymerization treatment and a cross-linking treatment so as to fix the alignment of the liquid crystal monomer and form a cholesteric layer of the non-liquid crystal polymer.

First, the coating solution that contains the liquid crystal monomer, the chiral dopant and at least one of the cross-linking agent and the polymerizing agent is prepared.

As the liquid crystal monomer, a nematic liquid crystal monomer is preferable, for example. More specifically, a monomer represented by the formula (1) below can be used. The liquid crystal monomer may be one kind or a combination of two or more kinds.

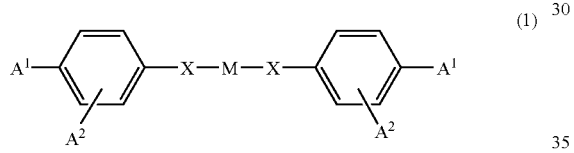

(1)

In the formula (1) above, $A^1$ and $A^2$ are each a polymerizable group and are identical or different, or one of $A^1$ and $A^2$ is hydrogen. X is each a single bond, —O—, —S—, —C═N—, —O—CO—, —CO—O—, —O—CO—O—, —CO—NR—, —NR—CO—, —NR—, —O—CO—NR—, —NR—CO—O—, —CH$_2$—O— or —NR—CO—NR, in which R is H or $C_1$–$C_4$-alkyl and M is a mesogenic group.

In the formula (1) above, Xs may be identical or different but preferably are identical.

In the monomer of the formula (1) above, $A^2$ preferably is ortho to $A^1$ at each occurrence.

Further, it is preferable that $A^1$ and $A^2$ mentioned above are each, independently from one another, represented by the formula below.

Z-X-(Sp)$_n$ (2)

It is preferable that $A^1$ and $A^2$ are identical.

In the formula (2) above, Z is a crosslinkable group, X is similar to that of the formula (1) above, Sp is a spacer formed of a straight-chain or branched chain alkyl group having 1 to 30 carbon atoms, and n is 0 or 1. The carbon chain in the Sp may be interrupted by ether oxygen, thio-ether sulfur, or nonadjacent imino or $C_1$–$C_4$-alkylimino groups.

In the formula (2) above, it is preferable that Z is any of the radicals represented by the formulae below. In the formulae below, R is, for example, methyl, ethyl, n-propyl, i-propyl, n-butyl, i-butyl or t-butyl.

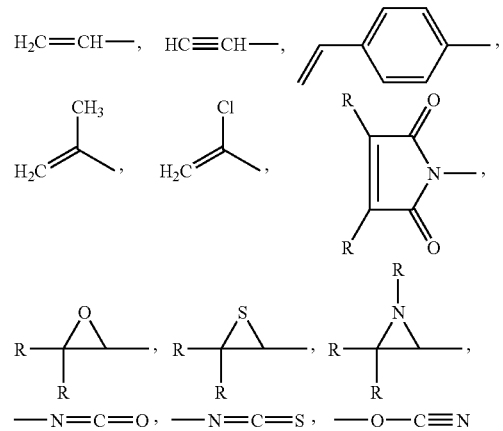

Also, in the formula (2) above, it is preferable that Sp is any of the radicals represented by the formulae below. In the formulae below, it is preferable that m is 1 to 3 and p is 1 to 12.

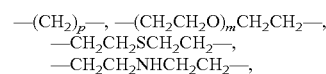

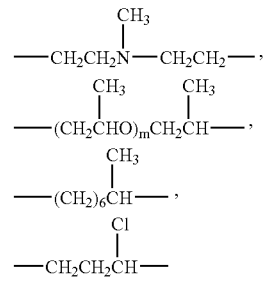

In the formula (1) above, it is preferable that M is represented by formula (3) below. In the formula (3) below, X is similar to X in the formula (1) above. Q is, for example, substituted or unsubstituted alkylene or aromatic hydrocarbon radicals or may be a substituted or unsubstituted straight-chain or branched-chain $C_1$–$C_{12}$-alkylene.

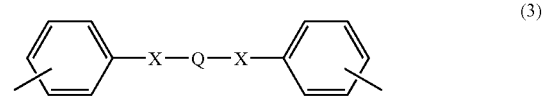

(3)

When Q is the aromatic hydrocarbon radicals, the radicals represented by the formulae below or substituted analogs thereof are preferable, for example.

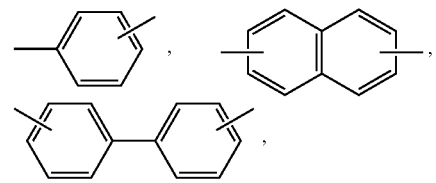

-continued

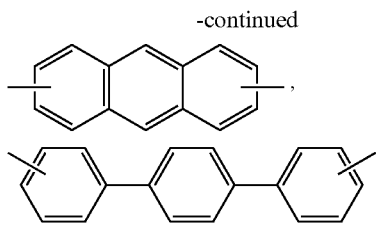

Substituted analogs of the aromatic hydrocarbon radicals represented by the formulae above may carry 1 to 4 substituents per aromatic ring, for example, or one or two substituents per aromatic ring or per group. The substituents may be identical or different. The substituents can be, for example, $C_1$–$C_4$-alkyl, nitro, halogen such as F, Cl, Br or I, phenyl or $C_1$–$C_4$-alkoxy.

Specific examples of the liquid crystal monomer can include monomers represented by the formulae (4) to (19) below.

(4)
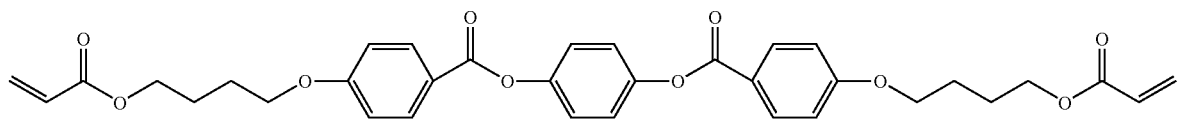

(5)
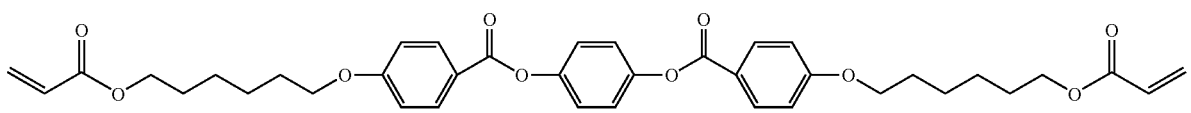

(6)
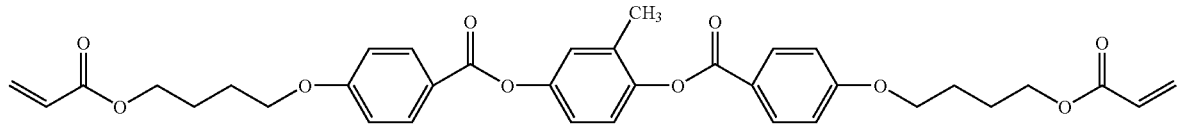

(7)
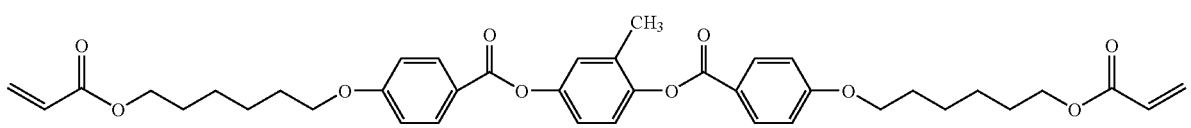

(8)
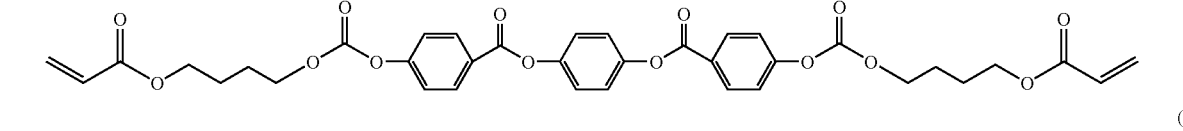

(9)
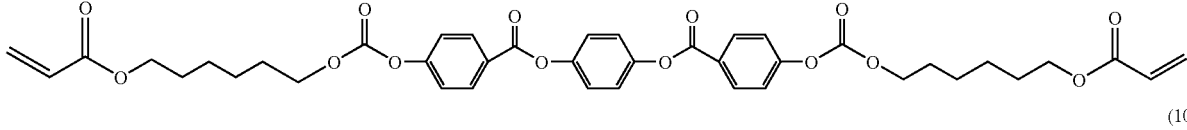

(10)
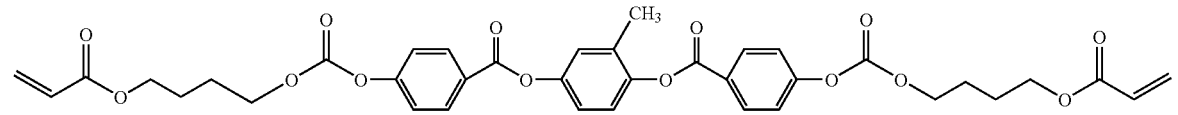

(11)
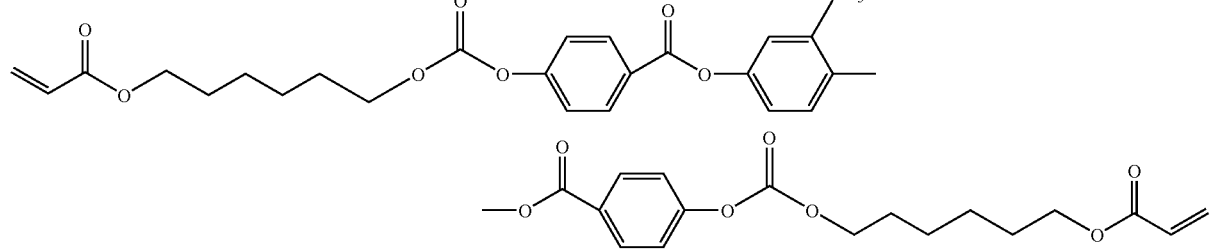

-continued
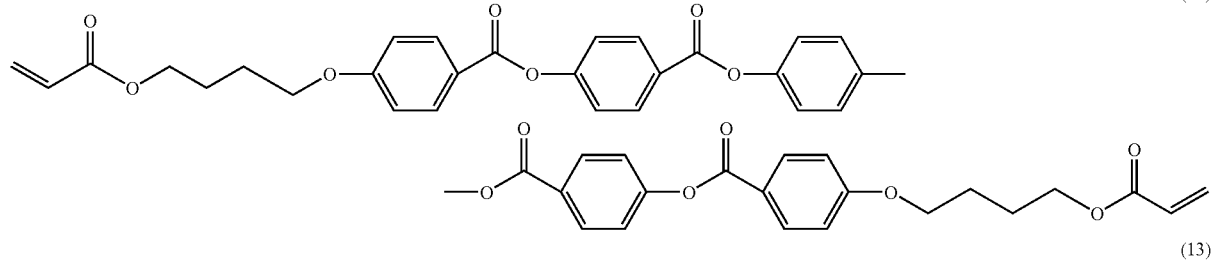
(12)
(13)
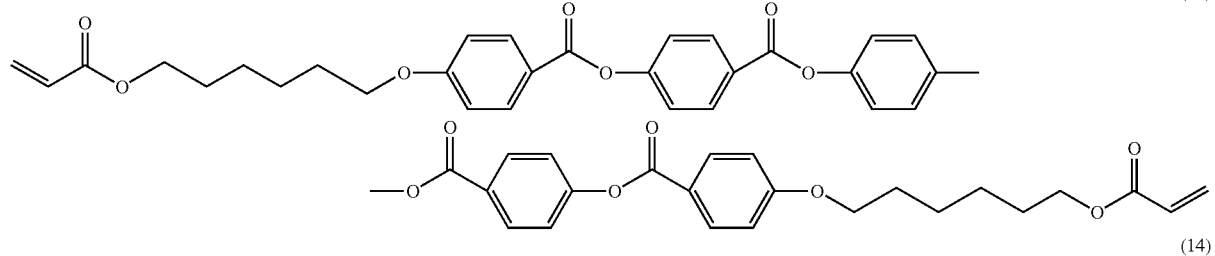
(14)
(15)
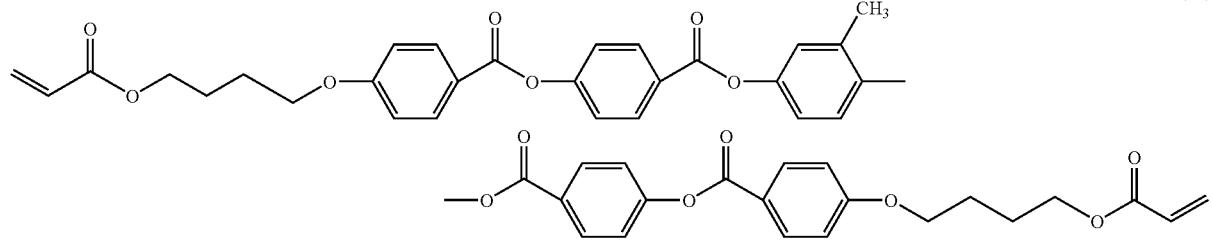
(16)
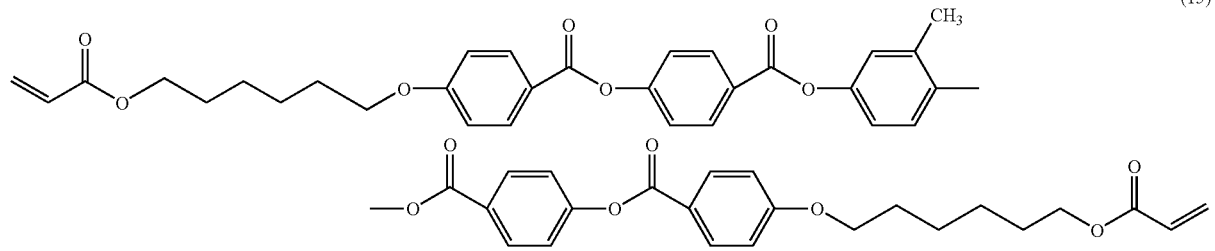
(17)
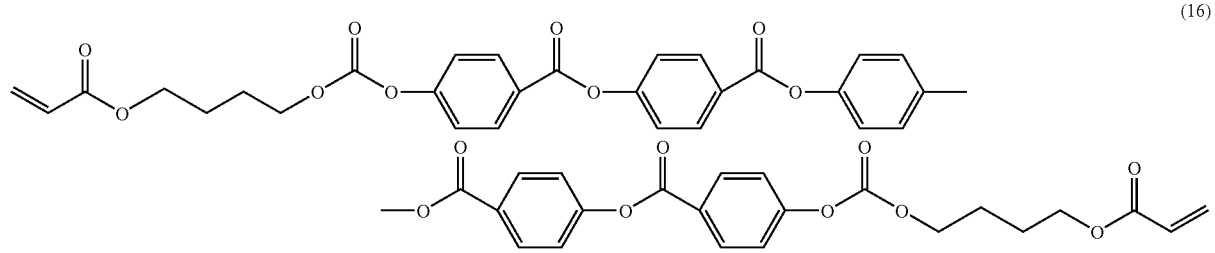
(18)
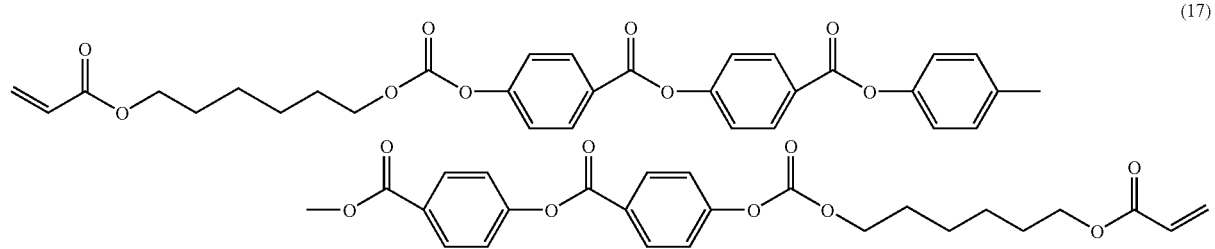
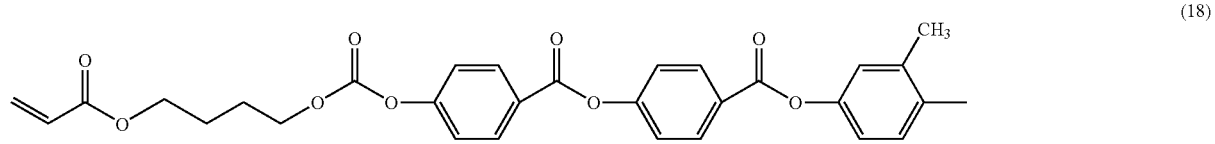

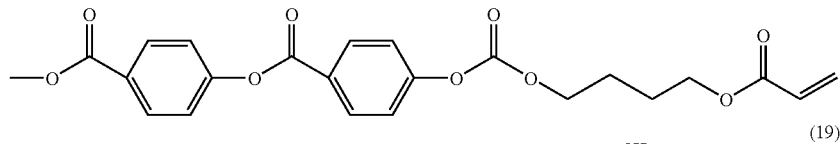

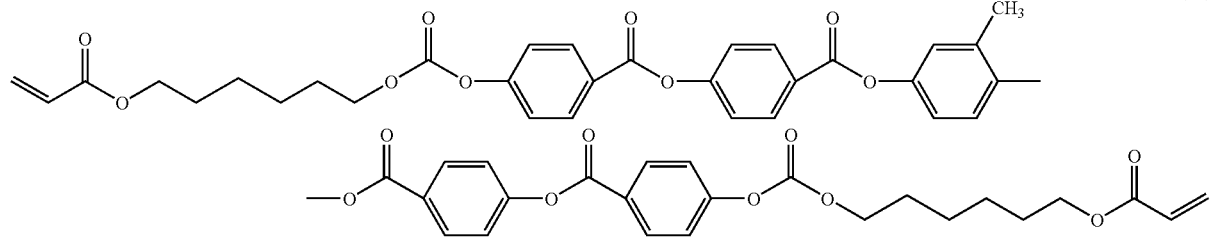

(19)

The temperature range in which the liquid crystal monomer shows a liquid crystalline property varies depending on their kinds but preferably ranges from 40° C. to 120° C., for example, more preferably ranges from 50° C. to 100° C., and particularly preferably ranges from 60° C. to 90° C.

Although there is no particular limitation on the chiral dopant as long as it twists and aligns the liquid crystal monomer so as to have a cholesteric structure as described above, for example, a polymerizable chiral dopant is preferable. The above-described chiral dopants can be used. These chiral dopants may be used alone or in combination of two or more.

More specifically, the polymerizable chiral dopant can be, for example, chiral compounds represented by the general formulae (20) to (23) below.

(20)

(21)

(22)

(23)

In the above formulae, Z is similar to that in the formula (2) above, Sp is similar to that in the formula (2) above, $X^2$, $X^3$ and $X^4$ are each, independently from one another, a chemical single bond, —O—, —S—, —O—CO—, —CO—O—, —O—CO—O—, —CO—NR—, —NR—CO—, —O—CO—NR—, —NR—CO—O— or —NR—CO—NR—, and R is H or $C_1$–$C_4$-alkyl. $X^5$ is a chemical single bond, —O—, —S—, —O—CO—, —CO—O—, —O—CO—O—, —CO—NR—, —NR—CO—, —O—CO—NR—, —NR—CO—O—, —NR—CO—NR, —$CH_2$O—, —O—$CH_2$—, —CH=N—N, —N=CH— or —N≡N—. Similarly to the above, R is H or $C_1$–$C_4$-alkyl. Similarly to the above, M is a mesogenic group. $P^1$ is hydrogen, a $C_1$–$C_{30}$-alkyl group, a $C_1$–$C_{30}$-acyl group or a $C_3$–$C_8$-cycloalkyl group substituted by 1 to 3 $C_1$–$C_6$-alkyl, and n is an integer from 1 to 6. Ch is an n-valent chiral group. In the formula (23) above, it is preferable that at least one of $X^3$ and $X^4$ is —O—CO—O—, —O—CO—NR—, —NR—CO—O— or —NR—CO—NR—. In the formula (22) above, when $P^1$ is an alkyl group, an acyl group or a cycloalkyl group, its carbon chain may be interrupted by ether oxygen, thioether sulfur or nonadjacent imino or $C_1$–$C_4$-alkylimino groups, for example.

Examples of the above-noted chiral group of Ch include radicals represented by the formulae below.

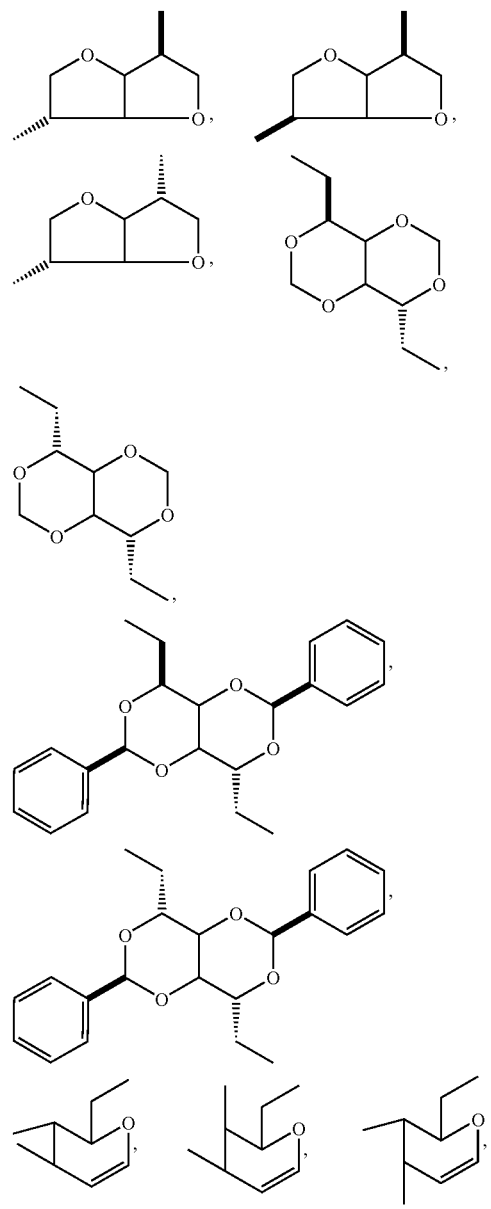

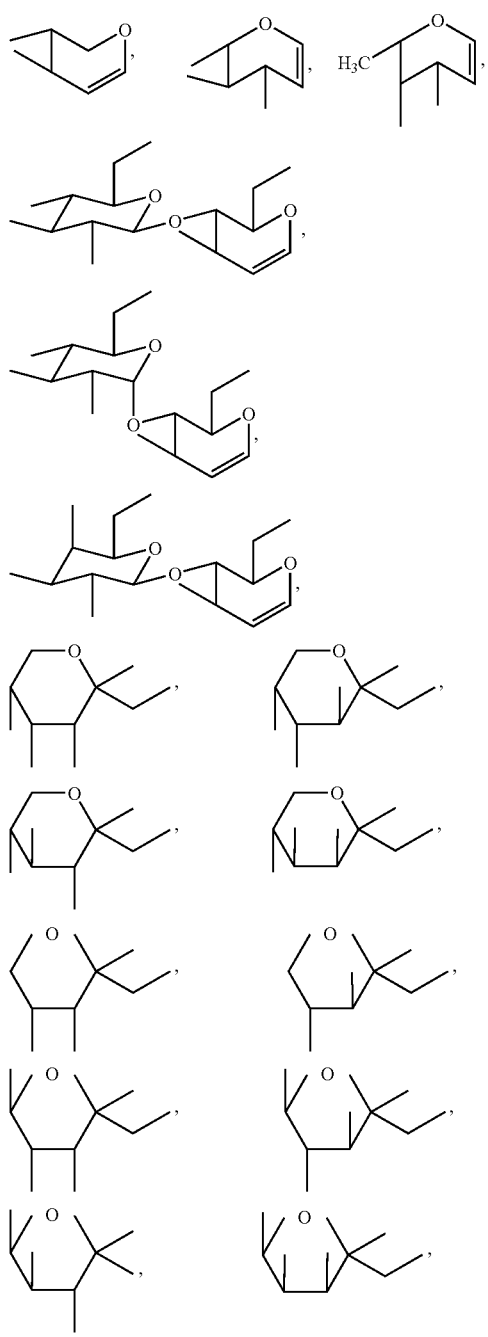
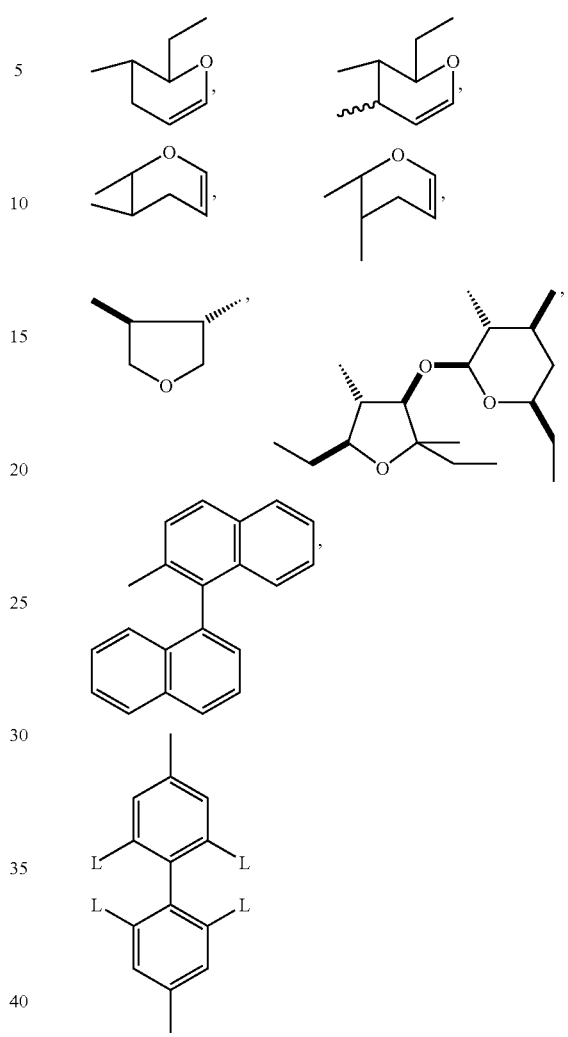
In the above radicals, L is $C_1$–$C_4$-alkyl, $C_1$–$C_4$-alkoxy, halogen, COOR, OCOR, CONHR or NHCOR, and R is $C_1$–$C_4$-alkyl. Terminal ends in the radicals represented by the formulae above indicate dangling bonds with the adjacent groups.
Among the above radicals, radicals represented by the formulae below are particularly preferable.
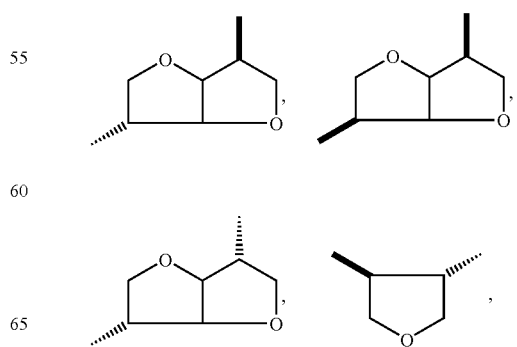

-continued

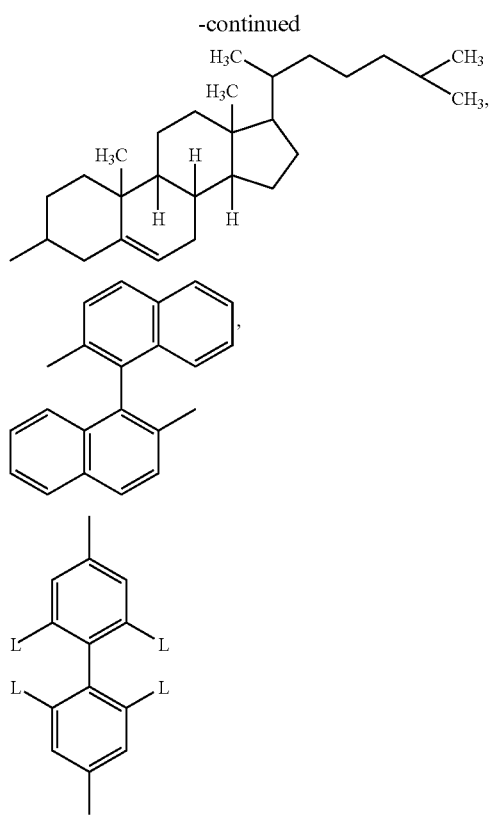

It is preferable that the chiral compound represented by the formula (21) or (23) above is, for example, a radical in which n is 2, Z is $H_2C=CH-$ and Ch is represented by any of the formulae below.

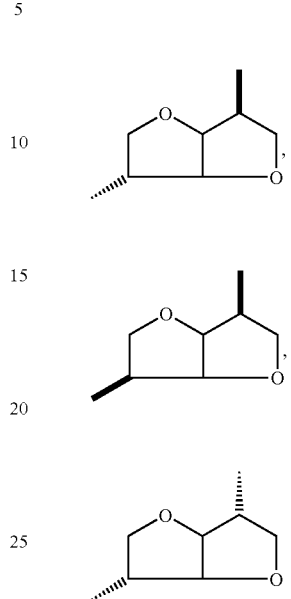

Specific examples of the chiral compound can include compounds represented by the formulae (24) to (44) below. Incidentally, these chiral compounds have a helical twisting power of at least $1 \times 10^{-6}$ $nm^{-1} \cdot (wt\ \%)^{-1}$.

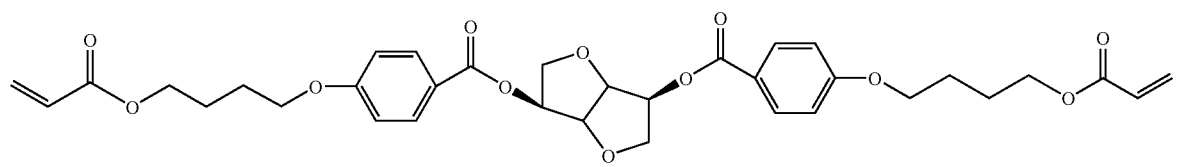
(24)

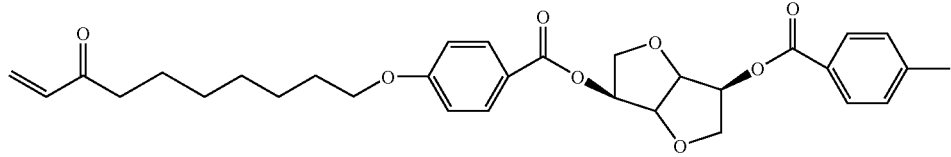
(25)

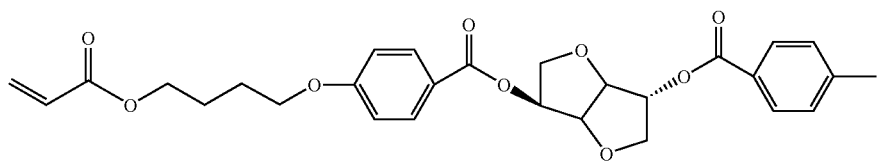
(26)

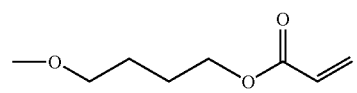

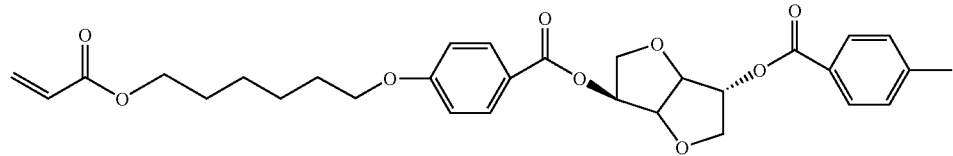
(27)
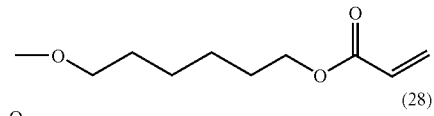
(28)
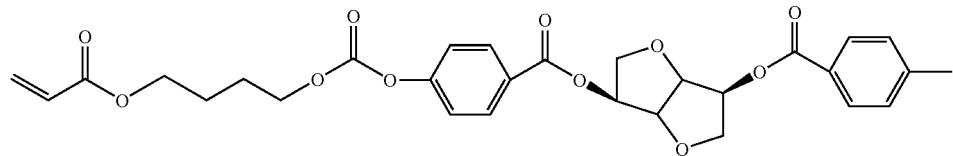
(29)
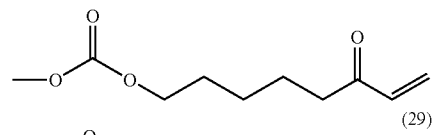
(30)
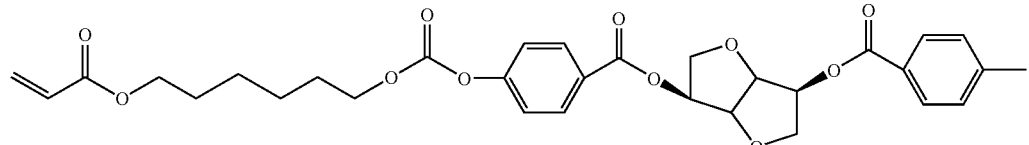
(31)
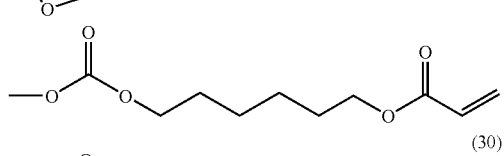
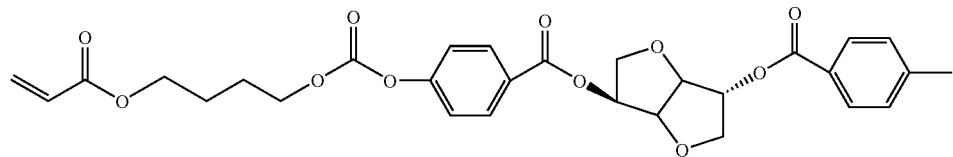
(32)
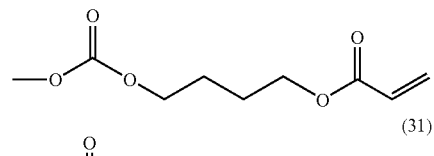
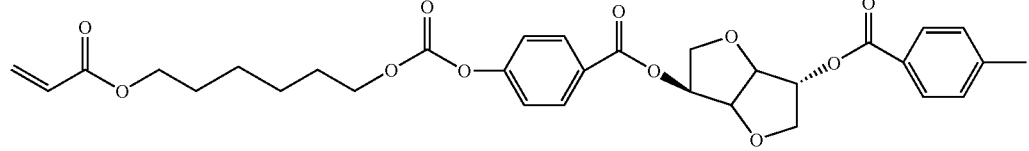
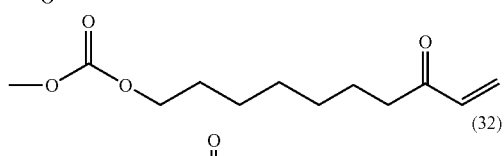
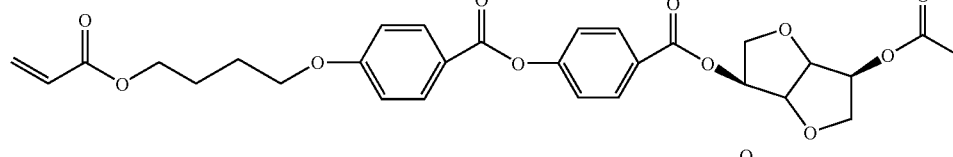
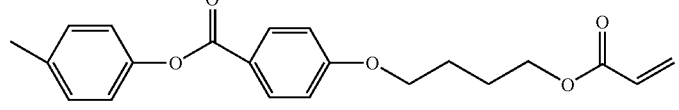

-continued
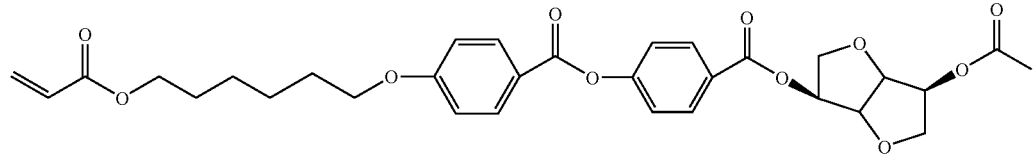
(33)
(34)
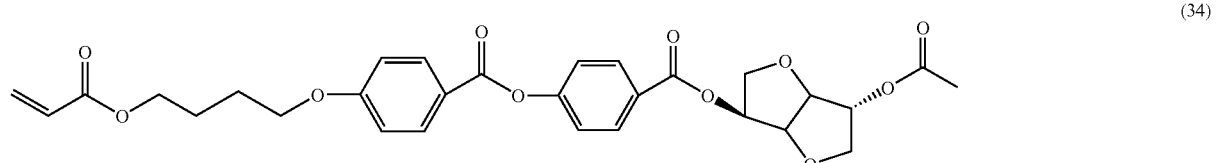
(35)
(36)
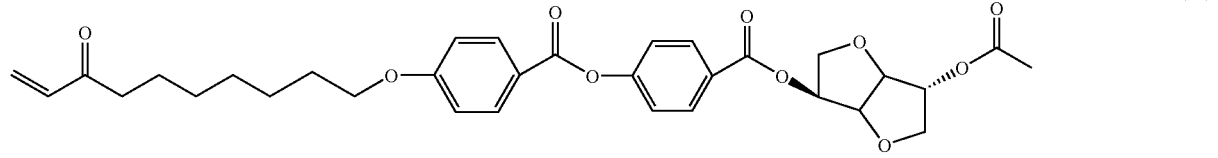
(37)
(38)
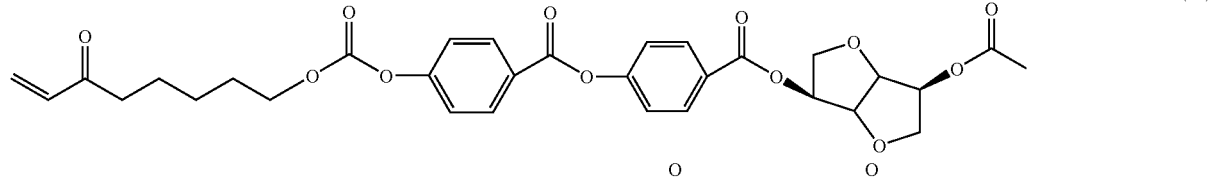
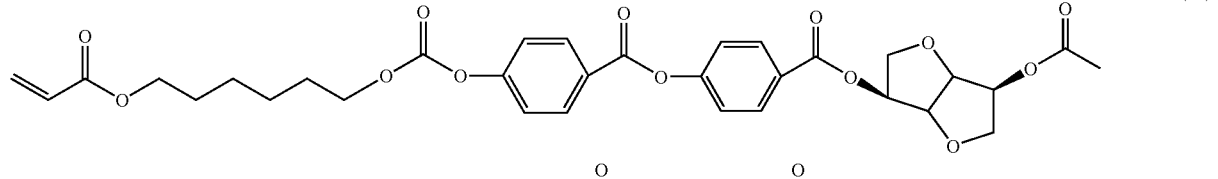
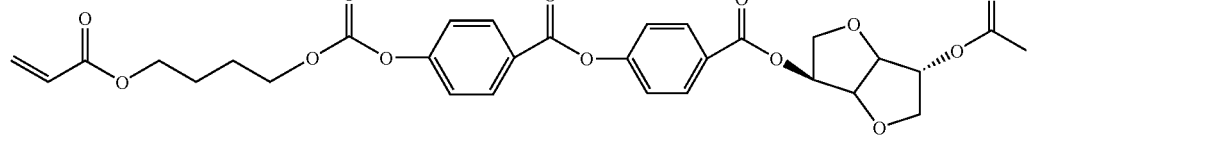

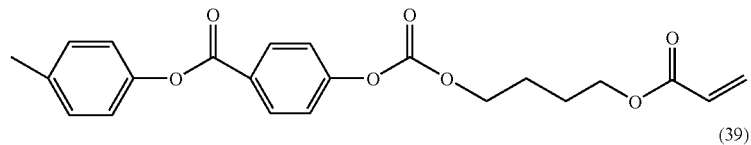
(39)
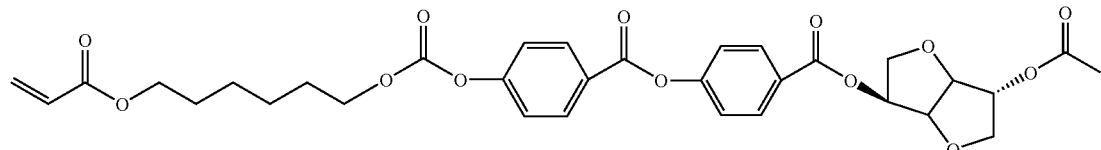
(40)
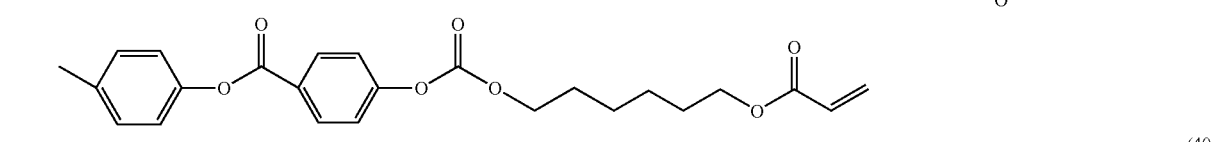
(41)
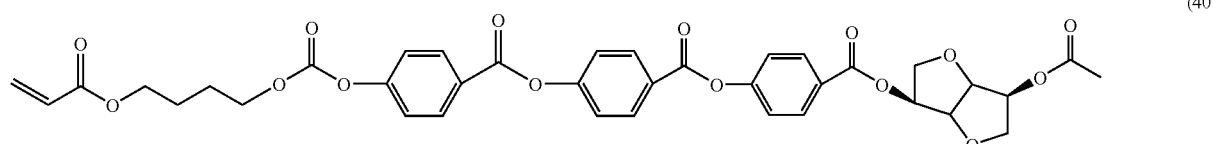
(42)
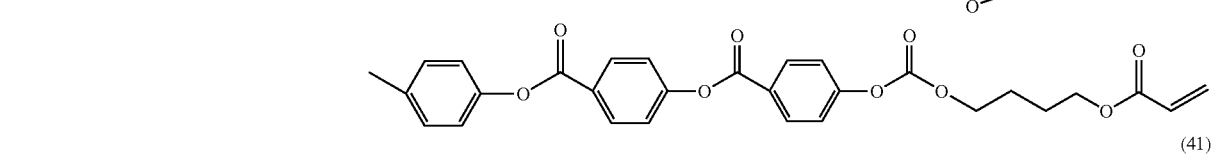
(43)

-continued (44)

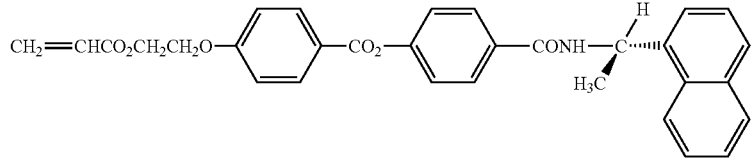

Other than the above-described chiral compounds, chiral compounds mentioned in, for example, RE-A 4342280, and German patent applications No. 19520660.6 and No. 19520704.1 can be used preferably.

The polymerizing agent and the cross-linking agent are not particularly limited but can be selected among the agents indicated below, for example. As the polymerizing agent, benzoyl peroxide (BPO), azobisisobutyronitrile (AIBN) or the like can be used, for example. As the cross-linking agent, an isocyanate-based cross-linking agent, an epoxy-based cross-linking agent, a metal chelate cross-linking agent or the like can be used, for example. These agents may be used alone or in combination of two or more.

The coating solution can be prepared by, for example, dissolving or dispersing the liquid crystal monomer or the like in a suitable solvent. The solvent is not particularly limited but can be, for example, halogenated hydrocarbons such as chloroform, dichloromethane, carbon tetrachloride, dichloroethane, tetrachloroethane, methylene chloride, trichloroethylene, tetrachloroethylene, chlorobenzene and orthodichlorobenzene; phenols such as phenol, p-chlorophenol, o-chlorophenol, m-cresol, o-cresol and p-cresol; aromatic hydrocarbons such as benzene, toluene, xylene, methoxybenzene and 1,2-dimethoxybenzene; ketone-based solvents such as acetone, methyl ethyl ketone (MEK), methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, tetrahydrofuran and dioxane; or carbon disulfide, ethyl cellosolve or butyl cellosolve. In particular, toluene, xylene, mesitylene, MEK, methyl isobutyl ketone, cyclohexanone, ethyl cellosolve, butyl cellosolve, ethyl acetate, butyl acetate, propyl acetate and ethyl cellosolve acetate are preferable. These solvents may be used alone or as a mixture of two or more, for example.

The ratio of the chiral dopant to be added is determined suitably according to a desired helical pitch or a desired selective reflection wavelength range, for example. The added ratio with respect to the liquid crystal monomer ranges, for example, from 5 wt % to 23 wt % and preferably ranges from 10 wt % to 20 wt %. As described above, by controlling the added ratio of the chiral dopant to the liquid crystal monomer in this manner, the selective wavelength range of an optical film to be formed can be set to the above-mentioned range. When the ratio of the chiral dopant to the liquid crystal monomer is 5 wt % or larger, for example, it becomes very easy to control the selective reflection wavelength range of an optical film to be formed at a shorter wavelength side. On the other hand, when this ratio is 23 wt % or smaller, the temperature range in which the liquid crystal monomer is aligned in the form of a cholesteric manner, that is, the temperature range in which the liquid crystal monomer is in a liquid crystalline phase becomes broad, so that a precise control of the temperature in an aligning process which will be described later is not necessary making the manufacturing significantly easier.

For example, when chiral dopants with equal helical twisting powers are used, the selective reflection wavelength range to be formed is shifted further to the shorter wavelength side with an increase in the added ratio of the chiral dopant with respect to the liquid crystal monomer. Also, when the added ratios of the chiral dopants with respect to the liquid crystal monomer are equal, the selective reflection wavelength range of an optical film to be formed is shifted further to the shorter wavelength side with an increase in the helical twisting power of the chiral dopants. As a specific example, in the case where the selective reflection wavelength range of the optical film to be formed is set to range from 200 to 220 nm, it is appropriate that the chiral dopant having a helical twisting power of $5 \times 10^{-4}$ nm$^{-1}$·(wt %)$^{-1}$ be blended to be 11 wt % to 13 wt % with respect to the liquid crystal monomer, for example. In the case where the selective reflection wavelength range is set to range from 290 to 310 nm, it is appropriate that the chiral dopant having a helical twisting power of $5 \times 10^{-4}$ nm$^{-1}$·(wt %)$^{-1}$ be blended to be 7 wt % to 9 wt % with respect to the liquid crystal monomer, for example.

The combination of the liquid crystal monomer and the chiral dopant is not particularly limited but specifically can be a combination of a monomer agent of the formula (10) above and the chiral dopant of the formula (38) above, that of a monomer agent of the formula (11) above and the chiral dopant of the formula (39) above, or the like.

Further, the added ratio of the cross-linking agent or the polymerizing agent to the liquid crystal monomer ranges, for example, from 0.1 wt % to 10 wt %, preferably from 0.5 wt % to 8 wt % and more preferably from 1 wt % to 5 wt %. When the ratio of the cross-linking agent or the polymerizing agent to the liquid crystal monomer is equal to or larger than 0.1 wt %, it becomes sufficiently easy to cure the cholesteric layer, for example. When this ratio is equal to or smaller than 10 wt %, the temperature range in which the liquid crystal monomer is aligned in the form of a cholesteric manner, that is, the temperature in which the liquid crystal monomer is in a liquid crystalline phase is sufficient, for example, so that the temperature can be controlled still more easily in the aligning process, which will be described later.

Moreover, for example, various additives may be blended suitably into the coating solution as necessary. Examples of such additives include an antioxidant, a denaturant, a surfactant, a dye, a pigment, a discoloration preventing agent, a UV absorber and the like. These additives may be used alone or in combination of two or more, for example. More specifically, conventionally known materials, for example, phenolic compounds, amine compounds, organic sulfur compounds or phosphinic compounds can be used as the antioxidant, and conventionally known materials, for example, glycols, silicones or alcohols can be used as the denaturant, for example. Furthermore, the surfactant is added, for example, for smoothing the surface of the optical compensation layer and can be, for example, a silicone surfactant, an acrylic surfactant, a fluorochemical surfactant or the like. In particular, a silicone surfactant is preferable.

When the liquid crystal monomer is used as above, the prepared coating solution has a viscosity with an excellent workability in application and expansion, for example. The viscosity of the coating solution usually varies depending on the concentration and temperature of the liquid crystal monomer. When the monomer concentration in the coating solution is in the above-noted range of 5 wt % to 70 wt %, the viscosity ranges, for example, from 0.2 to 20 mPa·s, preferably from 0.5 to 15 mPa·s and particularly preferably from 1 to 10 mPa·s. More specifically, when the monomer concentration of the coating solution is 30 wt %, the viscosity ranges, for example, from 2 to 5 mPa·s and preferably from 3 to 4 mPa·s. The coating solution viscosity of equal to or larger than 0.2 mPa·s further prevents the coating solution from flowing undesirably during application, for example, whereas the viscosity of equal to or smaller than 20 mPa·s achieves a still better surface smoothness, further prevents thickness unevenness and allows easy application. Incidentally, although the temperature range from 20° C. to 30° C. has been illustrated for the viscosity described above, there is no particular limitation to this temperature.

Next, the coating solution is applied onto the alignment substrate, thus forming the expanded layer.

It is appropriate that the coating solution be flow-expanded by a conventionally known method such as roller coating, spin coating, wire bar coating, dip coating, extrusion method, curtain coating or spray coating. Among these methods, spin coating and extrusion coating are preferable considering the application efficiency.

The alignment substrate is not particularly limited as long as it can align the liquid crystal monomer. For example, a substrate obtained by rubbing the surface of a plastic film or a plastic sheet of various kinds with a rayon cloth or the like can be used. The above-mentioned plastics is not particularly limited and can be, for example, triacetylcellulose (TAC), polyolefin such as polyethylene, polypropylene or poly(4-methyl pentene-1), polyimide, polyimide amide, polyetherimide, polyamide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose-based plastics, an epoxy resin, a phenolic resin or the like. Alternatively, the alignment substrate can be obtained by providing the above-mentioned plastic film or sheet on the surface of a substrate made of metal such as aluminum, copper or steel, a ceramic substrate or a glass substrate or by forming an obliquely deposited film of $SiO_2$ on that surface. Also, it may be possible to use as the alignment substrate a laminate of the above-mentioned plastic film or sheet and a birefringent stretched film that has been subjected to a stretching treatment such as uniaxial stretching to serve as an alignment film. Furthermore, it is preferable that the substrate itself is birefringent because the rubbing treatment and the lamination of the birefringent film on the surface described above are not necessary. The substrate itself can be made birefringent as above by, for example, casting and extrusion forming other than the stretching treatment during the formation of the substrate.

Subsequently, the expanded layer is subjected to a heat treatment, thereby aligning the liquid crystal monomer in a liquid crystalline state. Since the expanded layer contains the chiral dopant as well as the liquid crystal monomer, the liquid crystal monomer that is now in the liquid crystalline phase (the liquid crystalline state) is aligned while being given a twist by the chiral dopant. In other words, the liquid crystal monomer shows a cholesteric structure (a helical structure).

The temperature condition in the heat treatment can be determined suitably according to, for example, kinds of the liquid crystal monomer, more specifically, the temperature at which the liquid crystal monomer shows a liquid crystalline property. Usually, the temperature ranges from 40° C. to 120° C., preferably from 50° C. to 100° C., and more preferably from 60° C. to 90° C. A temperature equal to or higher than 40° C. usually makes it possible to align the liquid crystal monomer sufficiently, whereas a temperature equal to or lower than 120° C. allows a wide range of selectable alignment bases of various kinds as described above, taking into account heat resistance, for example.

Next, the expanded layer in which the liquid crystal monomer is aligned is subjected to a cross-linking treatment or a polymerization treatment, thereby polymerizing or cross-linking the liquid crystal monomers and the chiral dopant. In this manner, the liquid crystal monomers are polymerized or cross-linked within itself or with the chiral dopant while maintaining the orientation with the cholesteric structure, so that the orientation is fixed. Thus formed polymer is a non-liquid crystal polymer because the orientation has been fixed.

The polymerization treatment or the cross-linking treatment can be determined suitably depending on, for example, kinds of a polymerizing agent or a cross-linking agent to be used. For example, light irradiation is appropriate in the case of using a photopolymerizing agent or a photocross-linking agent, and ultraviolet irradiation is appropriate in the case of using an ultraviolet polymerizing agent or an ultraviolet cross-linking agent.

According to the method described above, it is possible to provide, on the alignment substrate, an optical compensation layer formed of the non-liquid crystal polymer that is aligned in the form of a cholesteric structure. This optical compensation layer shows a non-liquid crystalline property because its orientation is fixed as described above. Therefore, it does not transform, for example, between a liquid crystalline phase, a glassy phase and a crystalline phase according to changes in temperature, so that its orientation does not change with temperature. Consequently, it can be used for the optical compensation plate of the present invention as a high-performance retardation film that is not affected by temperature change. Furthermore, when the selective reflection wavelength range is controlled to the above-noted range, light leakage and the like as described above can be suppressed.

For example, the optical compensation layer can be peeled off from the alignment substrate and provided with an anti-cracking layer on at least one surface thereof. Alternatively, for example, an anti-cracking layer can be formed on the surface of the optical compensation layer which is in a state being laminated on the alignment substrate.

When the optical compensation layer is used as a laminate with the alignment substrate, it is preferable that the alignment substrate is a transparent plastic film. The plastic film can be a film formed of, for example, cellulose such as TAC, polyolefin such as polyethylene, polypropylene or poly(4-methyl pentene-1), polyimide, polyamide imide, polyamide, polyetherimide, polyether ether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose-based plastics, an epoxy resin, a phenolic resin, polynorbornene, polyester, polystyrene, polyvinyl chloride, polyvinylidene chloride, liquid crystal polymer or the like. These films may be optically isotropic or anisotropic. Among these plastic films, films respectively formed of polypropylene, polyethylene terephthalate and polyethylene naphthalate are preferable, for example, considering a solvent resistance and a heat resistance. Furthermore, the polymer film described in JP 2001-343529 A (WO 01/37007) also can be used, for example. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methylene maleimide and an acrylonitrile-styrene copolymer. The polymer film may be formed by extruding the resin composition.

The above-mentioned transparent alignment substrate may be a single layer, for example, or a laminate of different polymers for improving a strength, a heat resistance and adhesion to the polymer and the liquid crystal monomer, for example.

In addition, the transparent alignment substrate may generate no retardation owing to birefringence, or generate retardation owing to birefringence for the purpose of cancelling the polarization state of light reflected by a polarization separating layer, for example. Such cancelling of the polarization state improves an efficiency of light utilization and allows the light to have the same polarization state as light from the light source, so that visual hue variation can be suppressed effectively. The transparent substrate generating the retardation owing to birefringence can be selected among, for example, stretched films of various polymers and may be a substrate whose refractive index in the thickness direction is controlled. This controlling can be carried out by, for example, making the polymer film adhere to a heat-shrinkable film and stretching them while heating.

The thickness of the plastic film usually is 5 µm to 500 µm, preferably is 10 to 200 µm, and more preferably is 15 to 150 µm. The thickness equal to or larger than 5 µm provides a sufficient strength to the substrate, so that it is possible to prevent a problem of fracture during manufacturing or the like.

The optical compensation layer in the optical compensation plate of the present invention can include, as the constituent molecules, the above-noted non-liquid crystal polymers but it can also include a liquid crystal polymer. In such a case, a cholesteric layer having liquid crystal polymers as constituent molecules can be formed by the method including the steps of, for example, forming an expanded layer by expanding onto an alignment base a coating solution that contains the above-mentioned liquid crystal polymer and the chiral dopant, and subjecting the expanded layer to a heat treatment so that the liquid crystal monomer can be aligned in the form of a cholesteric structure.

The polarizing plate of the present invention includes, as mentioned above, a polarizer, a transparent protective layer and the optical compensation plate of the present invention, and the polarizer and the optical compensation plate are laminated together via the transparent protective layer.

The structure of the polarizing plate of the present invention is not particularly limited as long as the anti-cracking layer is laminated on at least one surface of the optical compensation layer. Specific examples are described below.

First example is a structure in which the optical compensation plate and the transparent protective layer are directly adhered to each other via the anti-cracking layer of the optical compensation plate. Such a polarizing plate can be formed by, for example, when manufacturing the optical compensation plate, applying the curable adhesive agent onto the surface of the optical compensation layer, then disposing further the laminate of the transparent protective film and the polarizer onto the coating film of the curable adhesive agent so as to allow the laminate and the coating film to be in contact with each other, and subsequently curing the coating film. According to this structure, the anti-cracking layer serves to prevent cracks in the optical compensation layer, and also can function to adhere of the laminate of the polarizer and the transparent protective layer with the optical compensation layer, thus providing the polarizing plate which is excellent in terms of strength and thickness. Here, it is preferable that the laminate of the transparent protective layer and the polarizer is disposed so that the transparent protective layer may be in contact with the coating film of the curable adhesive agent, and that the transparent protective layer and the anti-cracking layer are adhered directly to each other.

The transparent protective layer may be laminated only on one surface of the polarizer or both surfaces thereof. In the case of laminating the transparent protective layer on both surfaces, the kinds of transparent protective layers to be used may be, for example, the same or different.

Here, the anti-cracking layer can be laminated on one surface of the optical compensation layer or both surfaces thereof.

When the anti-cracking layer is laminated on only one surface of the optical compensation layer as mentioned above, the optical compensation plate preferably has a structure in which, for example, a pressure-sensitive adhesive layer is additionally laminated on the surface of the optical compensation layer opposed to the surface on which the anti-cracking layer is laminated. Moreover, the anti-cracking layer which is laminated on the surface of the optical compensation layer and the polarizer are preferably laminated together via the transparent protective layer. According to this structure, cracks in the optical compensation layer can be prevented by the anti-cracking layer, and it can be bonded with, for example, a liquid crystal cell, and any other optical member or the like easily as necessary. Since the pressure-sensitive adhesive layer can be thin, the thickness of the polarizing plate of the present invention also can be reduced.

The thickness of the pressure-sensitive adhesive layer is not particularly limited, but it ranges, for example, from 5 to 50 µm, more preferably ranges from 10 to 40 µm, and particularly preferably ranges from 15 to 35 µm.

Though the material of the pressure-sensitive adhesive layer is not particularly limited as long as it has a sticking property, conventionally known pressure-sensitive adhesives, such as an acrylic resin-based pressure-sensitive adhesive, a rubber-based pressure-sensitive adhesive and a vinyl-based pressure-sensitive adhesive, can be used.

The pressure-sensitive adhesive layer can be formed on the surface of the optical compensation layer by, for example, a method of applying a solution or melt of various materials directly onto the surface of the polarizing plate by an expanding method such as flow-expanding and coating. Alternatively, a pressure-sensitive adhesive layer is formed on a liner (a mold-releasing film), which will be described later, in the same manner and transferred to the surface of the optical compensation layer.

In the case of laminating the pressure-sensitive adhesive layer on the other surface of the optical compensation layer as mentioned above, it is preferable to dispose a liner on the surface of the pressure-sensitive adhesive layer so as to cover the surface, for the purpose of, for example, preventing contamination of the exposed surface of the pressure-sensitive adhesive layer, and maintaining the sticking property until the adhesive layer is put to use, i.e., for example, until the pressure-sensitive adhesive is bonded to another member. The liner can be made of a suitable film such as the below-mentioned transparent protective film, by applying a peeling coat of a peeling agent if required, and the peeling agent may be selected, for example, from a silicone-based agent, a long-chain alkyl-based agent, a fluorine-based agent, an agent comprising molybdenum sulfide or the like. Since this liner is peeled off before the use of the polarizing plate of the present invention, the thickness thereof is not particularly limited but may be the same as that of a conventionally known liner.

Whereas, in the case where the anti-cracking layers are formed on both surfaces of the optical compensation layer, one of the anti-cracking layers in the optical compensation plate and the polarizer are preferably laminated together via the transparent protective layer. Moreover, it is preferable in the optical compensation plate that the pressure-sensitive adhesive layer and the liner are further disposed in this order on the surface of the anti-cracking layer on which the polarizer is not laminated via the transparent protective layer. By laminating the anti-cracking layers on both surfaces of the optical compensation layer in this manner, the strength of the optical compensation plate further can be improved, and the pressure-sensitive adhesive layer can be attached easily to another member.

In the polarizing plate of the present invention, the polarizer is not particularly limited but a conventionally known polarizing film can be used. Specific examples include a film prepared by a conventionally known method of, for example, dyeing by allowing a film of various kinds to adsorb a dichroic material such as iodine or a dichroic dye, followed by cross-linking, stretching and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as PVA-based films, partially-formalized PVA-based films, partially-saponified films based on ethylene-vinyl acetate copolymer and cellulose-based films. Other than the above, polyene oriented films such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The protective layer is not particularly limited but can be a conventionally known transparent film. For example, a transparent protective films having excellent transparency, mechanical strength, thermal stability, moisture-shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in view of the polarization property and durability.

Moreover, the polymer film described in JP 2001-343529 A (WO 01/37007) also can be used. The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methylene maleimide and an acrylonitrile-styrene copolymer. Alternatively, the polymer film may be formed by extruding the resin composition.

It is preferable that the transparent protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the formula below, nx, ny, nz indicate refractive indices respectively in an X-axis direction, a Y-axis direction and a Z-axis direction of the transparent protective layer. Here, the X-axis direction is an axial direction exhibiting a maximum refractive index within the plane, the Y-axis direction is an axial direction perpendicular to the X axis within the plane, and the Z-axis direction is a thickness direction perpendicular to the X axis and the Y axis. The letter d denotes the thickness of the transparent protective layer.

$$Rth=[\{(nx+ny)/2\}-nz]\cdot d$$

The transparent protective layer further may have an optically compensating function. As such a transparent protective layer having the optically compensating function, it is possible to use, for example, a known layer used for preventing coloration caused by changes in a visible angle based on retardation in a liquid crystal cell or for widening a preferable viewing angle. Specific examples include various films obtained by stretching the above-described transparent resins uniaxially or biaxially, an oriented film of a liquid crystal polymer or the like, and a laminate obtained by providing an oriented layer of a liquid crystal polymer on a transparent base. Among the above, the oriented film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-oriented layer of a discotic or nematic liquid crystal polymer. This optically compensating retardation plate can be a commercially available product, for example, "UV film" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited but can be determined suitably according to retardation or protection strength, for example. In general, the thickness is in the range not greater than 5 mm, preferably not greater than 1 mm, more preferably from 1 to 500 μm, and particularly preferably from 5 to 150 μm.

The transparent protective layer can be formed suitably by a conventionally known method such as a method of coating the polarizing film with the above-mentioned various transparent resins or a method of laminating the transparent resin film, the optically compensating retardation plate or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims at preventing scratches on the surfaces of the polarizing plate, and is a treatment of, for example, providing a hardened coating film that is formed of a curable resin and has excellent hardness and smoothness onto a surface of the transparent protective layer. The curable resin can be, for example, ultraviolet-curing resins of silicone base, urethane base, acrylic, and epoxy base. The treatment can be carried out by a conventionally known method. The anti-sticking treatment aims at preventing adjacent layers from sticking to each other. The antireflection treatment aims at preventing reflection of external light on the surface of the polarizing plate, and can be carried out by forming a conventionally known antireflection layer or the like.

The anti-glare treatment aims at preventing reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 μm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as a sheet of optical layers comprising these layers, separately from the transparent protective layer.

In the polarizing plate of the present invention, the method for laminating the polarizer and the transparent protective layer on each other is not particularly limited but can be a conventionally known method. In general, a pressure-sensitive adhesive, an adhesive or the like can be used. The kinds thereof can be determined suitably depending on materials of the polarizing film and the transparent protective layer. The adhesive agent is not particularly limited but can be, for example, a polymer adhesive based on an acrylic substance, vinyl alcohol, silicone, polyester, polyurethane, polyether or the like, or a rubber-based adhesive. Among these materials, materials having excellent moisture absorption and heat resistance are preferable, for example. If the material has such properties, when the polarizer of the present invention is used in a liquid crystal display, for example, it is possible to provide a high-quality durable display apparatus that can prevent foaming or peeling caused by moisture absorption, degradation in the optical properties and warping of a liquid crystal cell caused by difference in thermal expansion coefficients and the like.

Also, the pressure-sensitive adhesive, the adhesive or the like described above do not peel off easily even when being exposed to moisture or heat, for example, and have excellent light transmittance and polarization degree. More specifically, polyvinyl alcohol-based adhesives are preferable when the polarizer is a polyvinyl alcohol-based film, in light of stability of adhering treatment. These adhesive and pressure-sensitive adhesive may be applied directly onto surfaces of the polarizer and the transparent protective layer, or a layer of a tape or the like formed of the adhesive or pressure-sensitive adhesive may be arranged on the surfaces thereof. Further, when these adhesives are prepared as an aqueous solution, for example, other additives or a catalyst such as an acid catalyst may be blended as necessary.

The pressure-sensitive adhesive layer can be a monolayer or a laminate. The laminate can include monolayers different from each other in the type or in the compositions. When arranged on both surfaces of the polarizer, the pressure-sensitive adhesive layers can be the same or can be different from each other in types or compositions.

The thickness of the pressure-sensitive adhesive layer can be determined suitably depending on the constituents or the like of the polarizing plate. In general, it is from 1 to 500 μm.

Adhesiveness of the pressure-sensitive adhesive layer can be controlled suitably by a conventionally known method. For example, the degree of cross-linkage and the molecular weight will be adjusted on the basis of a composition or molecular weight of the base polymer for forming the pressure-sensitive adhesive, a cross-linking method, a content ratio of the crosslinkable functional group, and a ratio of the blended cross-linking agent.

The optical compensation plate and the polarizing plate of the present invention may be treated with an UV absorber such as salicylate ester compounds, benzophenone compounds, benzotriazole compounds, cyanoacrylate compounds or nickel complex salt-based compounds, thus providing an UV absorbing capability.

The polarizing plate of the present invention is not limited to the above-mentioned structures, but further can include various optical members, such as a retardation film having other refractive index structures, a liquid crystal film, a light scattering film, a diffraction film or a polarizing film.

The polarizing plate of the present invention can be used in various display apparatus such as a liquid crystal display as described above. The liquid crystal display can be formed by a conventionally known method. That is, the liquid crystal display generally is formed by assembling suitably constituent parts including optical elements such as a liquid crystal cell and a polarizing plate and, as necessary, an illuminating system, and incorporating a driving circuit. The formation of the liquid crystal display of the present invention has no particular limitation as long as the polarizing plate of the present invention is used. The liquid crystal cell can be a cell of any types, for example, a TN type, an STN type or a π type.

More specific examples include a liquid crystal display in which the polarizing plate of the present invention is arranged on one side or both sides of a liquid crystal cell. Especially, in the case where the polarizing plate of the present invention includes the pressure-sensitive adhesive layer and the liner as mentioned above, the polarizing plate can be disposed by peeling off the liner and attaching the thus exposed pressure-sensitive adhesive layer to the liquid crystal cell. When disposing the polarizing plate to the liquid crystal cell, in the case where the retardation plate and the polarizing plate are disposed on both sides of the liquid crystal cell, the retardation plates or the polarizing plates can be the same or different. Moreover, for forming a liquid crystal display, one layer or two or more layers of suitable parts such as a diffusion plate, an anti-glare layer, an antireflection layer, a protective plate, a prism array sheet, a lens array sheet, an optical diffuser, a backlight, a reflective plate, a semitransparent reflective plate and a brightness enhancement plate can be arranged at suitable positions.

Next, the polarizing plate of the present invention can be used also for an organic EL apparatus, in the same manner as the above-described liquid crystal display.

In general, an organic EL apparatus has a luminant (organic EL luminant) that is prepared by laminating a transparent electrode, an organic ruminant layer and a metal electrode in a certain order on a transparent substrate. Here, the organic luminant layer is a laminate of various organic thin films. Known examples thereof include a laminate of a hole injection layer made of a triphenylamine derivative or the like and a ruminant layer made of a phosphorous organic solid such as anthracene; a laminate of the ruminant layer and an electron injection layer made of a perylene derivative or the like; or a laminate of the hole injection layer, the luminant layer and the electron injection layer.

In general, the organic EL apparatus emits light on the following principle: a voltage is applied to the transparent electrode and the metal electrode so as to inject holes and electrons into the organic ruminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied with a rectification with respect to the applied voltage.

It is preferred for the organic EL apparatus that at least one of the electrodes is transparent so as to obtain luminescence at the organic ruminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag and Al—Li can be used.

In an organic EL apparatus configured as described above, the organic luminant layer usually is made of a film that is extremely thin such as about 10 nm. Therefore, the organic ruminant layer can transmit substantially as much light as the transparent electrode does. As a result, when the layer does not illuminate, a light beam entering from the surface of the transparent substrate and passing through the transparent electrode and the organic luminant layer before being reflected at the metal layer comes out again to the surface of the transparent substrate. Thereby, the display surface of the organic EL apparatus looks like a mirror when viewed from the outside.

A transparent electrode can be provided on the surface of the organic ruminant layer that emits light by application of voltage. At the same time, in an organic EL apparatus including an organic EL ruminant having a metal electrode on the back surface of the organic ruminant layer, for example, a polarizing plate can be provided on the surface of the transparent electrode and a retardation plate can be provided between the transparent electrode and the polarizing plate. As this polarizing plate, the polarizing plate according to the present invention can be applied.

The retardation plate and the polarizing plate function to polarize light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4.

That is, the polarizing plate transmits only the linearly polarized light component among the external light entering the organic EL apparatus. In general, the linearly polarized light is changed into elliptically polarized light by the retardation plate. When the retardation plate is a quarter wavelength plate and when the angle of the polarization directions of the polarizing plate and the retardation plate is π/4, the light is changed into circularly polarized light.

Generally, this circularly polarized light passes through the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely.

The polarizer of the present invention is not limited to the application in the liquid crystal display and the EL apparatus mentioned above, but can be applied also to, for example, various self-light-emitting image displays such as a plasma display, a FED display and the like.

EXAMPLES

The following is a description of the present invention, with reference to the Examples and Comparative examples below. It should be noted that the present invention is not limited to these Examples alone.

Example 1

1 wt % aqueous solution of polyvinyl alcohol (PVA) (manufactured by The Nippon Synthetic Chemical Industry Co., Ltd.; trade name: NH-18) was applied onto a triacetyl cellulose (TAC) film (manufactured by Fuji Photo Film Co., Ltd.; trade name: T-50SH) with a thickness of 50 μm, and dried at 90° C., thereby forming a PVA film with the thickness of approximately 0.01 μm or less. Subsequently, the surface of this film was rubbed so that an alignment film was obtained. The liquid crystal monomer (a polymerizable rod-like nematic crystal) represented by the above formula (6) and the chiral dopant represented by the formula (44) were mixed at the weighted ratio of 8:1, respectively, and this mixture was dissolved into toluene so as to obtain a solution of 30 weight %. Moreover, a photopolymerization initiator (trade name: IRGACURE; manufactured by Ciba Specialty Chemicals) was added to the toluene solution so as to prepare a coating solution of 3 weight %. Next, the coating solution was applied onto the alignment film, which was subsequently treated by heat at 90° C. for 1 minute, thereby aligning the liquid crystal monomer. Furthermore, the liquid crystal monomers were polymerized by UV irradiation so as to fix the orientation. Subsequently, the TAC film and the PVA film were removed, thereby obtaining an optical compensation layer with a thickness of 5 μm. This optical compensation layer had 1 nm of in-plane retardation, and 200 nm of retardation in the thickness direction.

The thus obtained optical compensation layer and a commercially available polarizing plate (manufactured by Nitto Denko Corporation; trade name: SEG5224DU) were adhered to each other by roller, using an isocyanate-based adhesive (solvent: ethyl acetate, thickness: 5 μm) containing 30 weight % of isocyanate compound by the solid weight. The adhesive was cured by drying at 50° C. for 10 hours. The thickness of the anti-cracking layer of a curable adhesive formed by curing the adhesive was 5 μm, and the microhardness thereof was 0.2 GPa. Furthermore, the adhesive was applied onto the surface of the laminate on the side of the optical compensation layer to have a thickness of 5 μm. In a similar manner, an anti-cracking layer (thickness: 5 μm, microhardness: 0.2 GPa) was formed.

Next, a liner (a mold-releasing film, manufactured by Nitto Denko Corporation; trade name: RT-38G, used also in the following examples) was adhered onto the exposed surface of the adhesive layer by roller, using an acrylic pressure-sensitive adhesive (used also in the following examples, thickness: 20 μm). Thereby, the polarizing plate with the optical compensation layer attached thereto was manufactured.

Example 2

In a manner similar to Example 1, a polarizing plate was laminated on one surface of the optical compensation layer using the isocyanate-based adhesive (thickness: 5 μm), and the liner was adhered to the surface of the laminate on the side of the optical compensation layer by roller using the acrylic pressure-sensitive adhesive. Thereby, the polarizing plate with the optical compensation layer attached thereto was manufactured. The microhardness of the anti-cracking layer formed of the adhesive was 0.2 GPa.

Comparative Example 1

A polarizing plate with the optical compensation layer attached thereto was manufactured in the same manner as Example 1, except that the polarizing plate and the liner were laminated together using the acrylic pressure-sensitive adhesive instead of the isocyanate-based adhesive. Here, regarding the microhardness of the layer formed of the pressure-sensitive adhesive, the measurement was not practicable.

The polarizing plates with the optical compensation layers attached thereto, which were obtained according to Example 1, 2 and Comparative example 1, were cut into the size of 50 mm×150 mm so as to make samples, and the occurrence of cracks in each optical compensation layer was observed while applying a load to the sample. The method will be described as follows.

The sample was placed on the horizontal table so that the mold-releasing film of the sample may face upward. Then, the occurrence of cracks in the optical compensation layer were visually observed by reciprocating twice a pen point with a diameter of 0.5 mm while applying a predetermined load (200 g, 400 g) from the liner side, by using Heidon surface inspection machine (manufactured by Shinto Scientific Co., Ltd.; trade name: HEIDON-14D). During this time, the occurrence of cracks in the optical compensation layer was visually observed. The results are shown in Table 1 below.

TABLE 1

| | Example 1 | Example 2 | Comparative example 1 |
|---|---|---|---|
| Components | polarizing plate isocyanate-based adhesive optical compensation layer isocyanate-based adhesive | polarizing plate isocyanate-based adhesive optical compensation layer acrylic pressure-sensitive adhesive | polarizing plate acrylic pressure-sensitive adhesive optical compensation layer acrylic pressure-sensitive adhesive |
| Load | | | |
| 200 g | not cracked | not cracked | cracked |
| 400 g | not cracked | not cracked | cracked |

As mentioned above, in the polarizing plate of each example in which an anti-cracking layer was formed on at least one surface of the optical compensation layer by a curable adhesive agent, the occurrence of cracks was not observed even when a local pressure was applied, unlike the comparative example. Moreover, in the polarizing plate according to Example 1, in which isocyanate-based adhesive layers are formed on both surfaces of the optical compensation layer, the occurrence of cracks was not observed even when a load of 600 g was applied. Consequently, it was established that the strength of the polarizing plate can be improved by providing an anti-cracking layer on at least one surface of the optical compensation layer.

INDUSTRIAL APPLICABILITY

As described above, according to the optical compensation plate of the present invention, the occurrence of cracks in the optical compensation layer, which is caused, for example, by a shake or a locally applied pressure, can be prevented by the anti-cracking layer formed of a curable adhesive agent. Thus, since the optical compensation plate of the present invention is hardly affected by a shake during transportation, a shock applied in use or the like, decoloration and the like caused by the occurrence of cracks can be prevented, thereby providing an image display apparatus and the like having an excellent quality.

The invention claimed is:

1. An optical compensation plate comprising an optical compensation layer, and an anti-cracking layer which is laminated directly on at least one surface of the optical compensation layer, wherein a microhardness of the anti-cracking layer ranges from 0.1 to 0.5 GPa, said anti-cracking layer is formed of a curable adhesive agent which comprises at least one thermosetting resin-based adhesive selected from the group consisting of an epoxy resin, an isocyanate resin and a polyimide resin, and said optical compensation layer is a cholesteric layer whose constituent molecules are aligned in the form of a cholesteric structure, wherein the constituent molecule of the cholesteric layer is produced from a liquid crystal monomer and a chiral dopant.

the liquid crystal monomer is selected from the group consisting of: a compound represented by the below formula (4); a compound represented by the below formula (5); a compound represented by the below formula (6); a compound represented by the below formula (7); a compound represented by the below formula (8); a compound represented by the below formula (9); a compound represented by the below formula (10); a compound represented by the below formula (11); a compound represented by the below formula (12); a compound represented by the below formula (13); a compound represented by the below formula (14); a compound represented by the below formula (15); a compound represented by the below formula (16); a compound represented by the below formula (17); a compound represented by the below formula (18); and a compound represented by the below formula (19), and the chiral dopant is selected from the group consisting of; a compound represented by the below formula (24); a compound represented by the below formula (25); a compound represented by the below formula (26); a compound represented by the below formula (27); a compound represented by the below formula (28); a compound represented by the below formula (29); a compound represented by the below formula (30); a compound represented by the below formula (31); a compound represented by the below formula (32); a compound represented by the below formula (33); a compound represented by the below formula (34); a compound represented by the below formula (35); a compound represented by the below formula (36); a compound represented by the below formula (37); a compound represented by the below formula (38); a compound represented by the below formula (39); a compound represented by the below formula (40); a compound represented by the below formula (41); a compound represented by the below formula (42); a compound represented by the below formula (43); and a compound represented by the below formula (44)

(4)

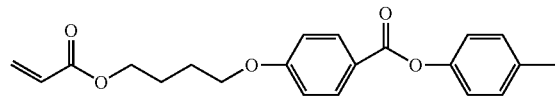

(5)

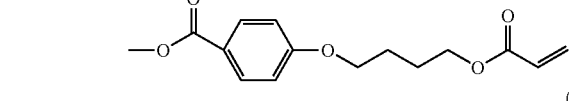

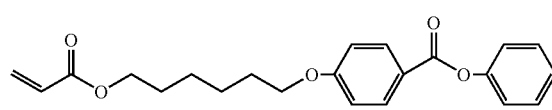

-continued

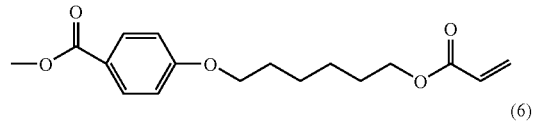

(6)

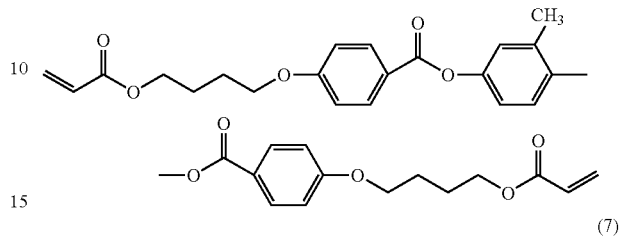

(7)

(8)

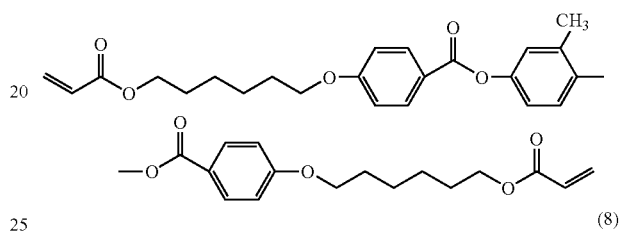

(9)

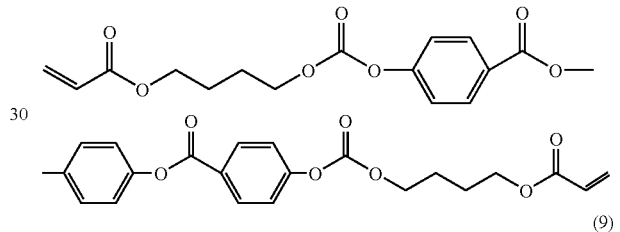

(10)

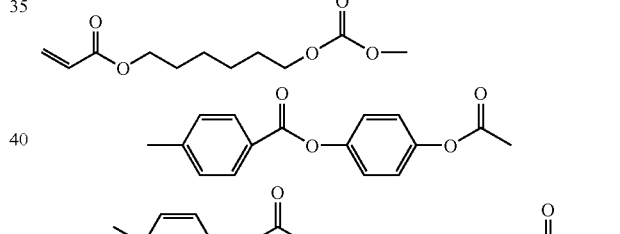

(11)

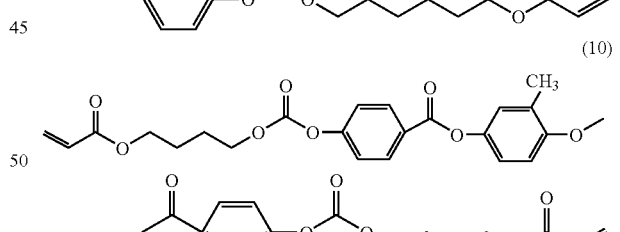

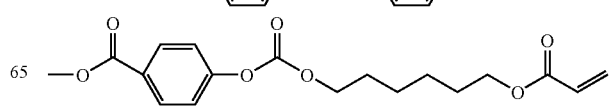

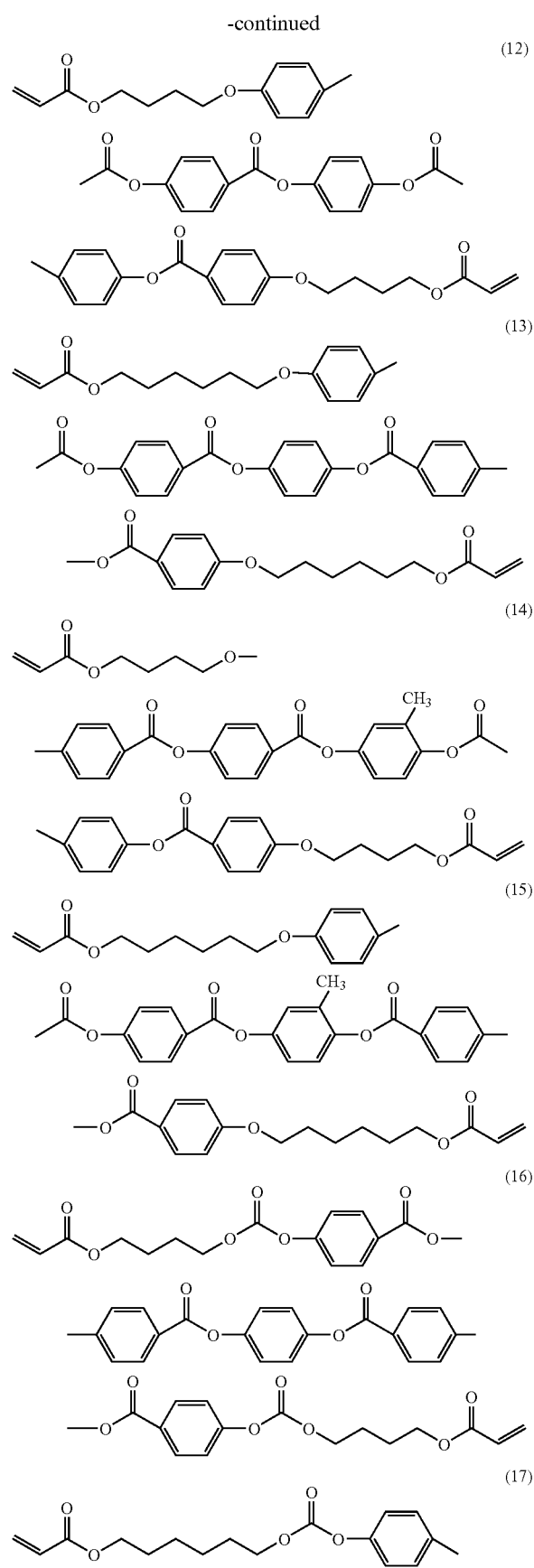

-continued
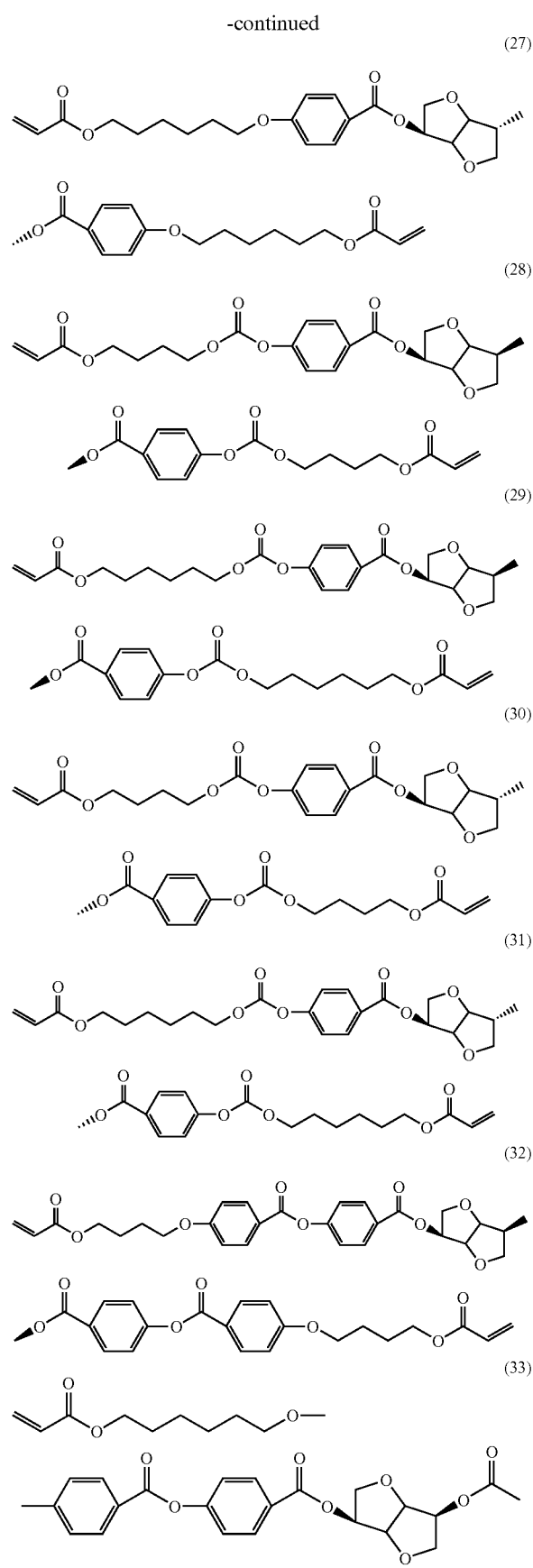
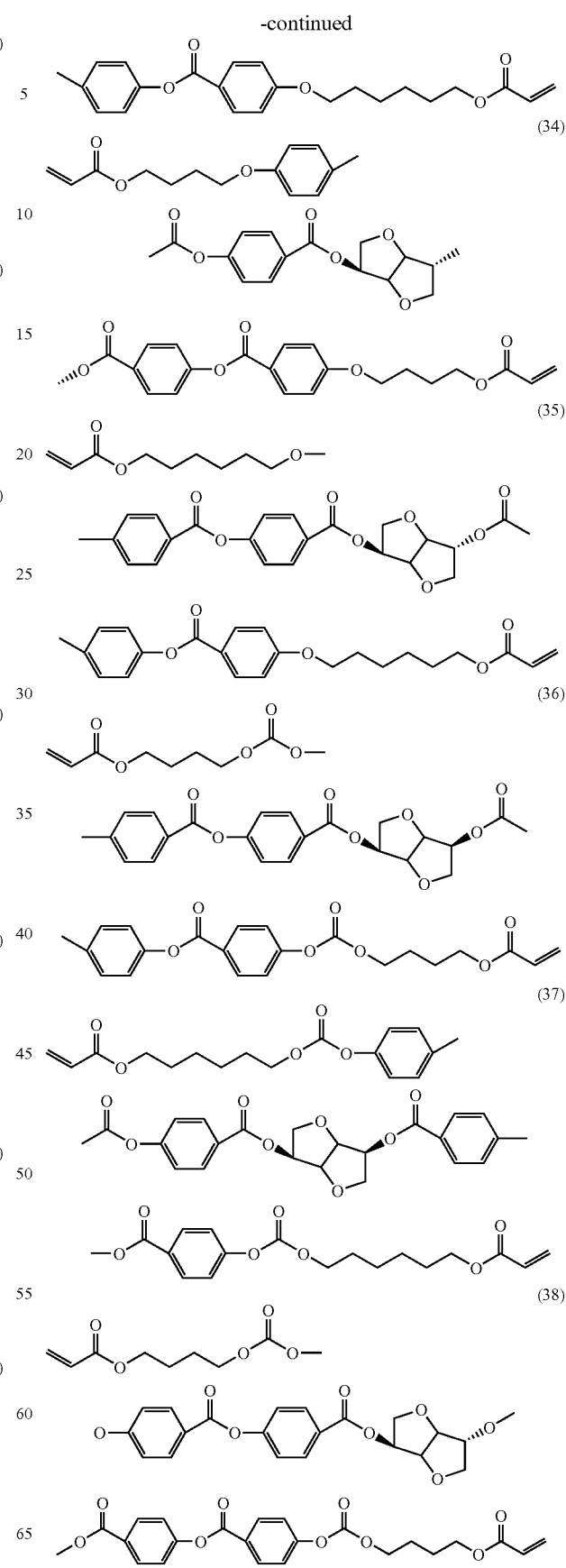

-continued

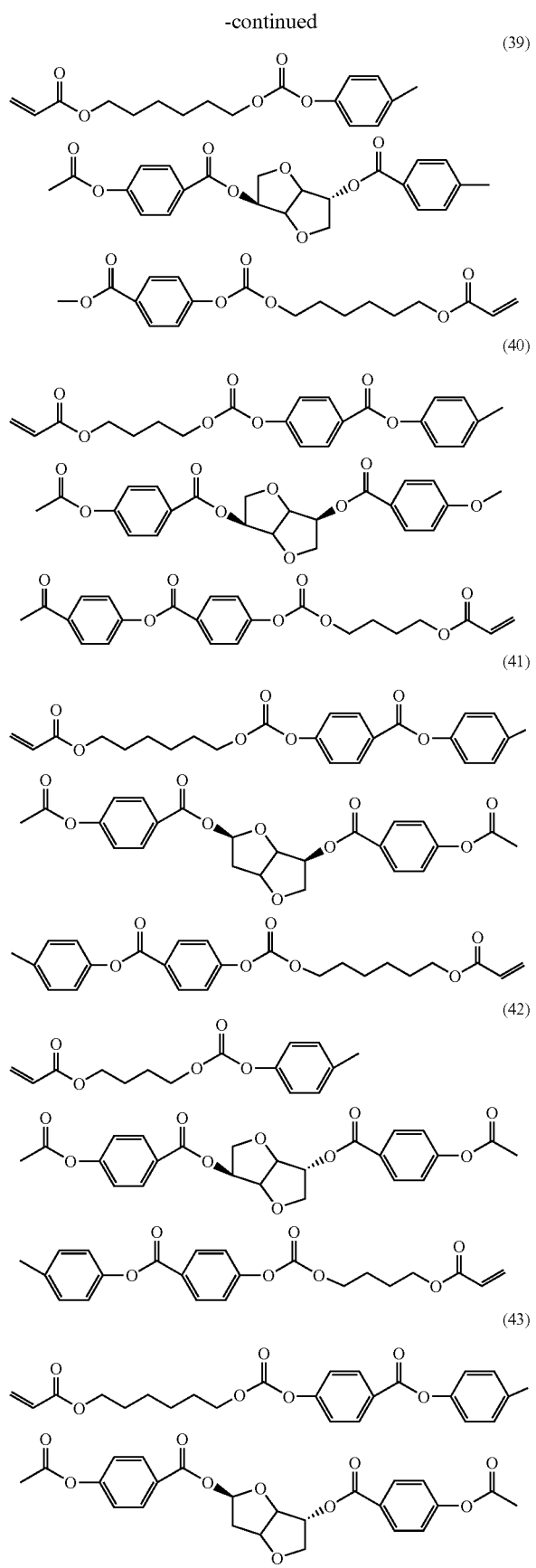

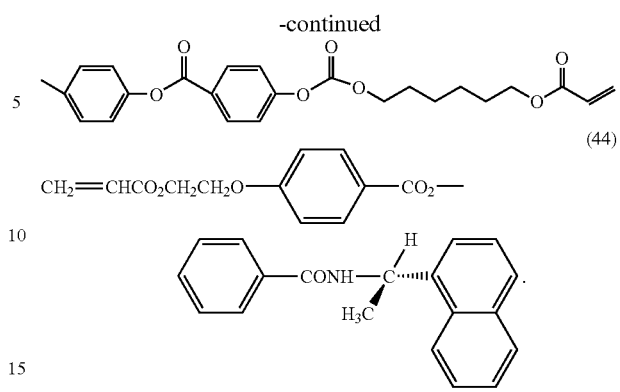

2. The optical compensation plate according to claim 1, wherein a thickness of the ant-cracking layer ranges from 0.1 to 20 μm.

3. The optical compensation plate according to claim 1, wherein the thickness of the cholesteric layer ranges from 0.5 to 10 μm.

4. The optical compensation plate according to claim 1, wherein a helical pitch of a cholesteric alignment ranges from 0.01 to 0.25 μm.

5. A polarizing plate comprising a polarizer, a transparent protective layer and the optical compensation plate according to claim 1, wherein the polarizer and the optical compensation plate are laminated together via the transparent protective layer.

6. The polarizing plate according to claim 5, wherein the optical compensation plate and the transparent protective layer are directly adhered to each other by the anti-cracking layer in the optical compensation plate.

7. The polarizing plate according to claim 5, wherein, in the optical compensation plate, a pressure-sensitive adhesive layer is laminated on the surface of the optical compensation layer opposing to the surface on which the anti-cracking layer is laminated.

8. The polarizing plate according to claim 7, wherein a material of the pressure-sensitive adhesive layer is at least one resin-based pressure-sensitive adhesive selected from the group consisting of an acrylic resin, a rubber-based resin and a vinyl-based resin.

9. The polarizing plate according to claim 7, wherein a liner is further disposed on the surface of the pressure-sensitive adhesive layer.

10. The polarizing plate according to claim 5,
wherein the optical compensation plate is configured by laminating an anti-cracking layer on both surfaces of the optical compensation layer, and
one of the anti-cracking layers and the polarizer are laminated together via the transparent protective layer.

11. The polarizing plate according to claim 10, wherein, in the optical compensation plate, a pressure-sensitive adhesive layer and a liner are further disposed in this order on the surface of the anti-cracking layer on which the polarizer is not laminated.

12. A liquid crystal panel, comprising a liquid crystal cell and the polarizing plate according to claim 5.

13. A liquid crystal display comprising the liquid crystal panel of claim 12.

14. An image display apparatus, which is at least one image display apparatus selected from the group consisting of an electroluminescence (EL) display, a plasma display (PD) and a field emission display (FED), comprising the polarizing plate according to claim 5.

15. A liquid crystal panel, comprising a liquid crystal cell and the optical compensation plate according to claim 1.

16. A liquid crystal display comprising the liquid crystal panel of claim 15.

17. An image display apparatus, which is at least one image display apparatus selected from the group consisting of an electroluminescence (EL) display, a plasma display (PD) and a field emission display (FED), comprising the optical compensation plate according to claim 1.

* * * * *